US011544467B2

(12) United States Patent
Turcato et al.

(10) Patent No.: US 11,544,467 B2
(45) Date of Patent: Jan. 3, 2023

(54) SYSTEMS AND METHODS FOR IDENTIFICATION OF REPETITIVE LANGUAGE IN DOCUMENT USING LINGUISTIC ANALYSIS AND CORRECTION THEREOF

(71) Applicant: Microsoft Technology Licensing, LLC, Redmond, WA (US)

(72) Inventors: Davide Turcato, Dublin (IE); Alfredo R. Arnaiz, Bellevue, WA (US); Domenic Joseph Cipollone, Montgomery, OH (US); Michael Wilson Daniels, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 113 days.

(21) Appl. No.: 16/902,034

(22) Filed: Jun. 15, 2020

(65) Prior Publication Data
US 2021/0390258 A1 Dec. 16, 2021

(51) Int. Cl.
*G06F 40/30* (2020.01)
*G06N 20/00* (2019.01)
*G06F 40/211* (2020.01)

(52) U.S. Cl.
CPC ............ *G06F 40/30* (2020.01); *G06F 40/211* (2020.01); *G06N 20/00* (2019.01)

(58) Field of Classification Search
CPC ................................ G06F 40/30; G06N 20/00
(Continued)

(56) References Cited

U.S. PATENT DOCUMENTS

| 5,576,955 A | 11/1996 | Newbold et al. |
| 5,940,847 A | 8/1999 | Fein et al. |

(Continued)

FOREIGN PATENT DOCUMENTS

| WO | 2006035402 A1 | 4/2006 |
| WO | 2012076742 A1 | 6/2012 |

OTHER PUBLICATIONS

H. Yang, A. De Roeck, V. Gervasi, A. Willis and B. Nuseibeh, "Speculative requirements: Automatic detection of uncertainty in natural language requirements," 2012 20th IEEE International Requirements Engineering Conference (RE), 2012, pp. 11-20, doi: 10.1109/RE.2012.6345795. (Year: 2012).*

(Continued)

*Primary Examiner* — Bharatkumar S Shah

(57) ABSTRACT

The present disclosure relates to processing operations configured to provide a linguistic-based approach to evaluating repetition in content of an electronic document. The approach of the present disclosure is about detecting terms/words/phrases that are likely to be perceived as being repetitious by native speakers of a language rather than just identifying the occurrence of identical words or strings in a document as done by traditional language checks. Processing of the present disclosure detects and evaluates terms or phrases using positive linguistic evidence derived from evaluation of linguistic relationships between words in a string in syntactic ways. This results in more accurate and efficient determination as to whether a term is truly repetitious at the linguistic level as compared with traditional language checks. As compared with string-based evaluation, fewer flags are raised for identification of repetitive/overused language, but more precise/accurate identification of repetition occurs using processing of the present disclosure.

20 Claims, 11 Drawing Sheets

(58) Field of Classification Search
USPC .......................................................... 704/9
See application file for complete search history.

(56) References Cited

U.S. PATENT DOCUMENTS

| | | | |
|---|---|---|---|
| 6,167,368 A * | 12/2000 | Wacholder | G06F 40/289 707/E17.058 |
| 6,583,798 B1 | 6/2003 | Hoek et al. | |
| 7,136,877 B2 | 11/2006 | Volcani et al. | |
| 9,218,333 B2 | 12/2015 | Liensberger | |
| 9,292,621 B1 | 3/2016 | Roth | |
| 2004/0194036 A1 | 9/2004 | Wolska et al. | |
| 2013/0151956 A1 | 6/2013 | Allen | |
| 2014/0104175 A1 | 4/2014 | Ouyang et al. | |
| 2014/0227044 A1 * | 8/2014 | Youngblood, Jr. | B29C 65/20 156/60 |
| 2015/0199913 A1 | 7/2015 | Mayfield et al. | |
| 2015/0347383 A1 | 12/2015 | Willmore | |
| 2016/0253299 A1 | 9/2016 | Mese et al. | |
| 2017/0178528 A1 | 6/2017 | Mayfield et al. | |
| 2017/0220536 A1 | 8/2017 | Chiba et al. | |
| 2019/0050387 A1 | 2/2019 | Sanghavi et al. | |
| 2020/0159823 A1 | 5/2020 | Lam et al. | |
| 2020/0334329 A1 | 10/2020 | Chen et al. | |
| 2020/0372105 A1 | 11/2020 | Gerges et al. | |

OTHER PUBLICATIONS

H. Yang, A. De Roeck, V. Gervasi, A. Willis and B. Nuseibeh, "Speculative requirements: Automatic detection of uncertainty in natural language requirements," 2012 20th IEEE International Requirements Engineering Conference (RE), 2012, pp. 11-20, doi: 10.1109/RE.2012.6345795. (Year: 2012) (Year: 2012).*

"Common Grammatical Errors: Wordiness", Retrieved From: https://web.archive.org/web/20121015082623/http://bethune.yorku.ca:80/writing/wordiness/, Oct. 15, 2012, 2 Pages.

Lambert, Joan, "Microsoft Word 2019 Step by Step", In Publication of Microsoft Press, Feb. 4, 2019, 24 Pages.

Lambert, Joan, "Microsoft Word 2019 Step by Step: InformIT", Retrieved From: https://www.informit.com/store/microsoft-word-2019-step-by-step-9781509305872, Apr. 2, 2019, 2 Pages.

"International Search Report and Written Opinion Issued in PCT Application No. PCT/US21/026082", dated Jul. 20, 2021, 16 Pages.

Sundararaman, et al., "Syntax-Infused Transformer and BERT Models for Machine Translation and Natural Language Understanding", In Repository of arXiv:1911.06156v1, Nov. 10, 2019, 7 Pages.

"Non Final Office Action Issued in U.S. Appl. No. 16/420,857", dated Aug. 31, 2021, 19 Pages.

"International Search Report and Written Opinion Issued in PCT Application No. PCT/US20/028173", dated Jul. 31, 2020, 12 Pages.

Putze, et al., "Automatic Classification of Auto-correction Errors in Predictive Text Entry Based on EEG and Context Information", In Proceedings of the 19th ACM International Conference on Multimodal Interaction, Nov. 13, 2017, 9 Pages.

"Non Final Office Action Issued In U.S. Appl. No. 16/420,857", dated Dec. 28, 2020, 24 Pages.

"Final Office Action Issued in U.S. Appl. No. 16/420,857", dated Feb. 1, 2022, 33 Pages.

"Final Office Action Issued in U.S. Appl. No. 16/420,857", dated May 20, 2021, 34 Pages.

"Repetition Detector 2", Retrieved from https://web.archive.org/web/20191222040718/http://www.repetition-detector.com/, Dec. 22, 2019, 2 Pages.

"Grammarly", Retrieved from https://www.grammarly.com/, Retrieved on Jul. 17, 2019, 4 Pages.

"Notice of Allowance Issued in U.S. Appl. No. 16/420,857", dated Jun. 1, 2022, 11 Pages.

"Notice of Allowance Issued in U.S. Appl. No. 16/420,857", dated Aug. 25, 2022, 12 Pages.

* cited by examiner

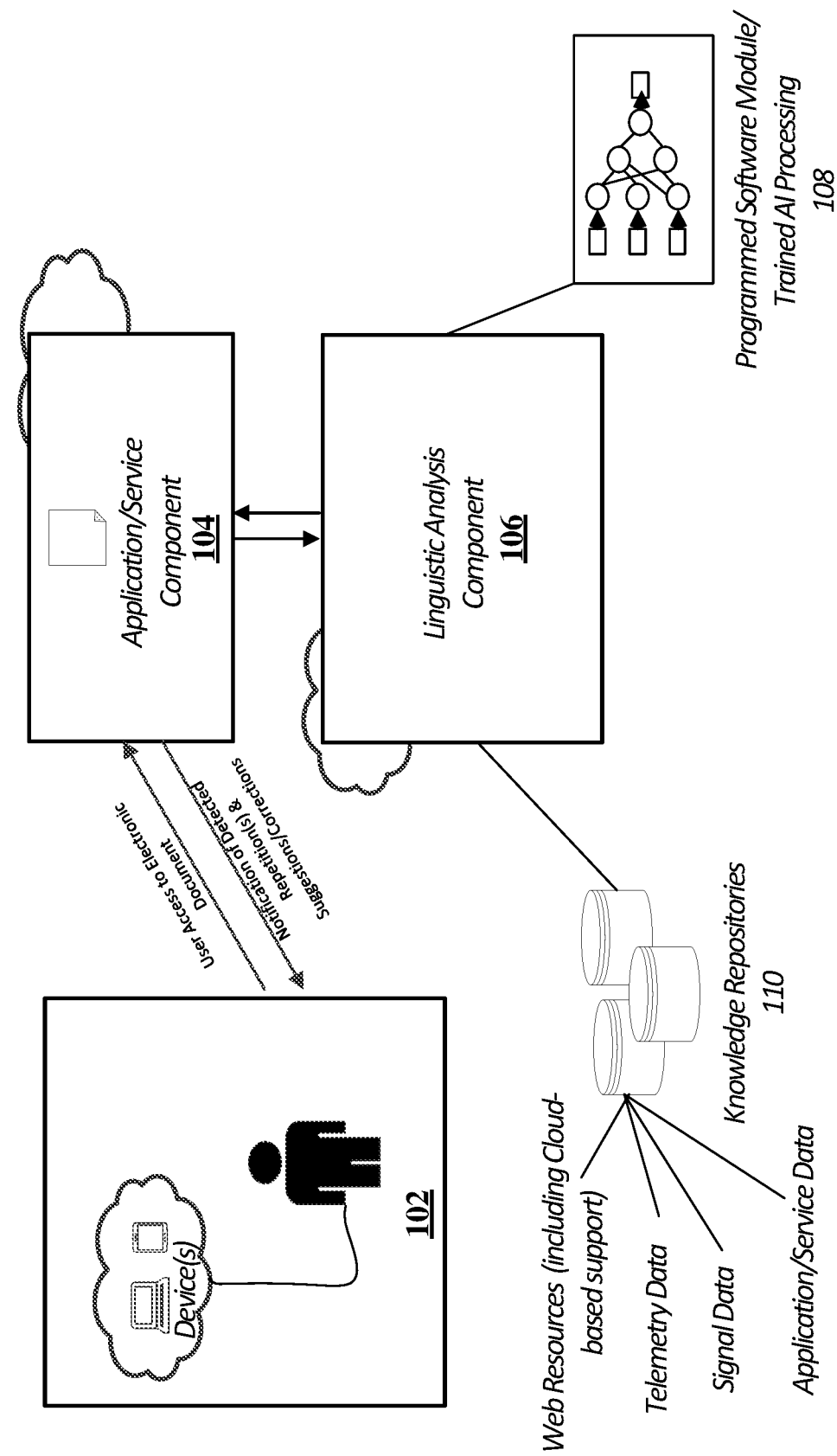

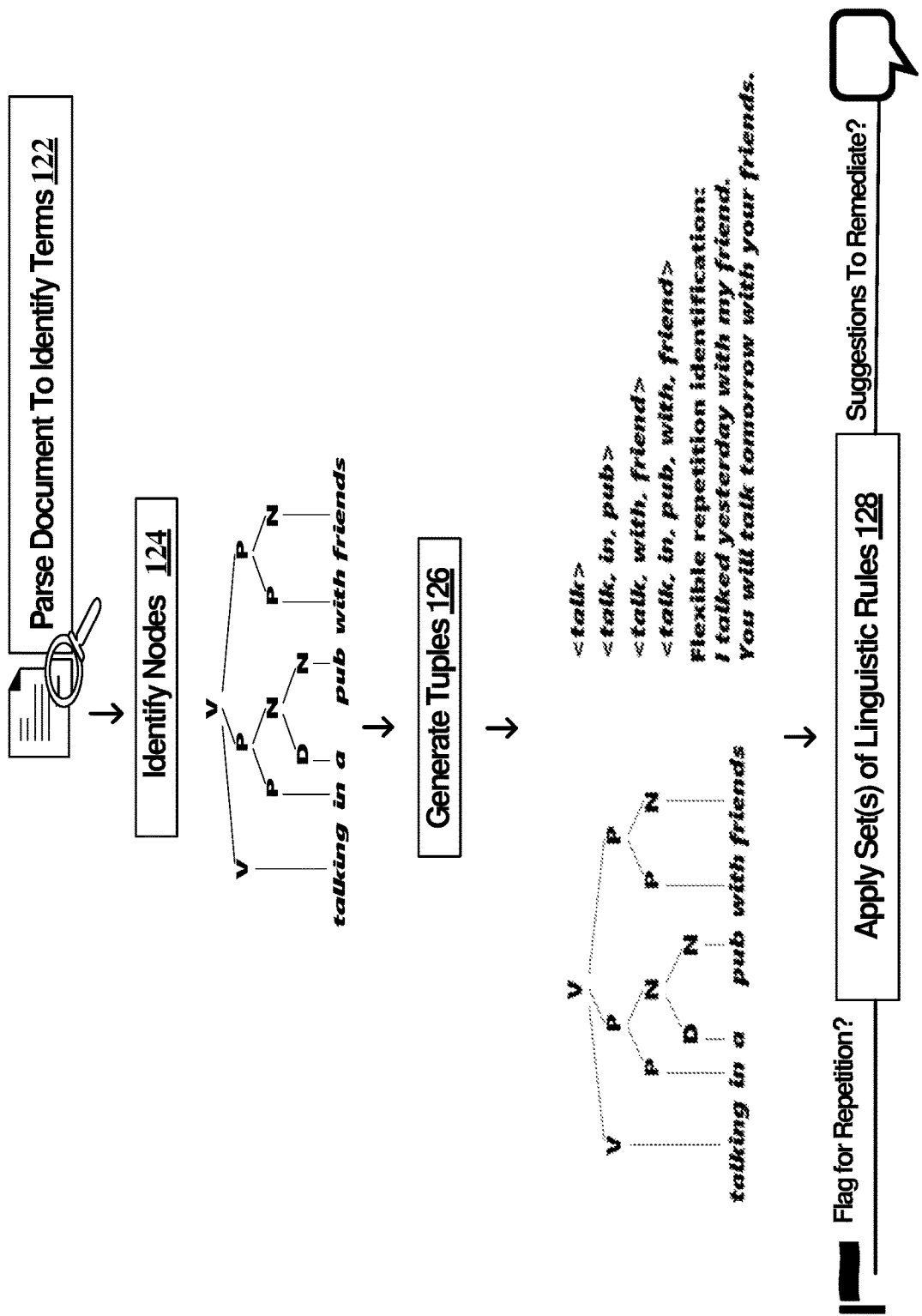

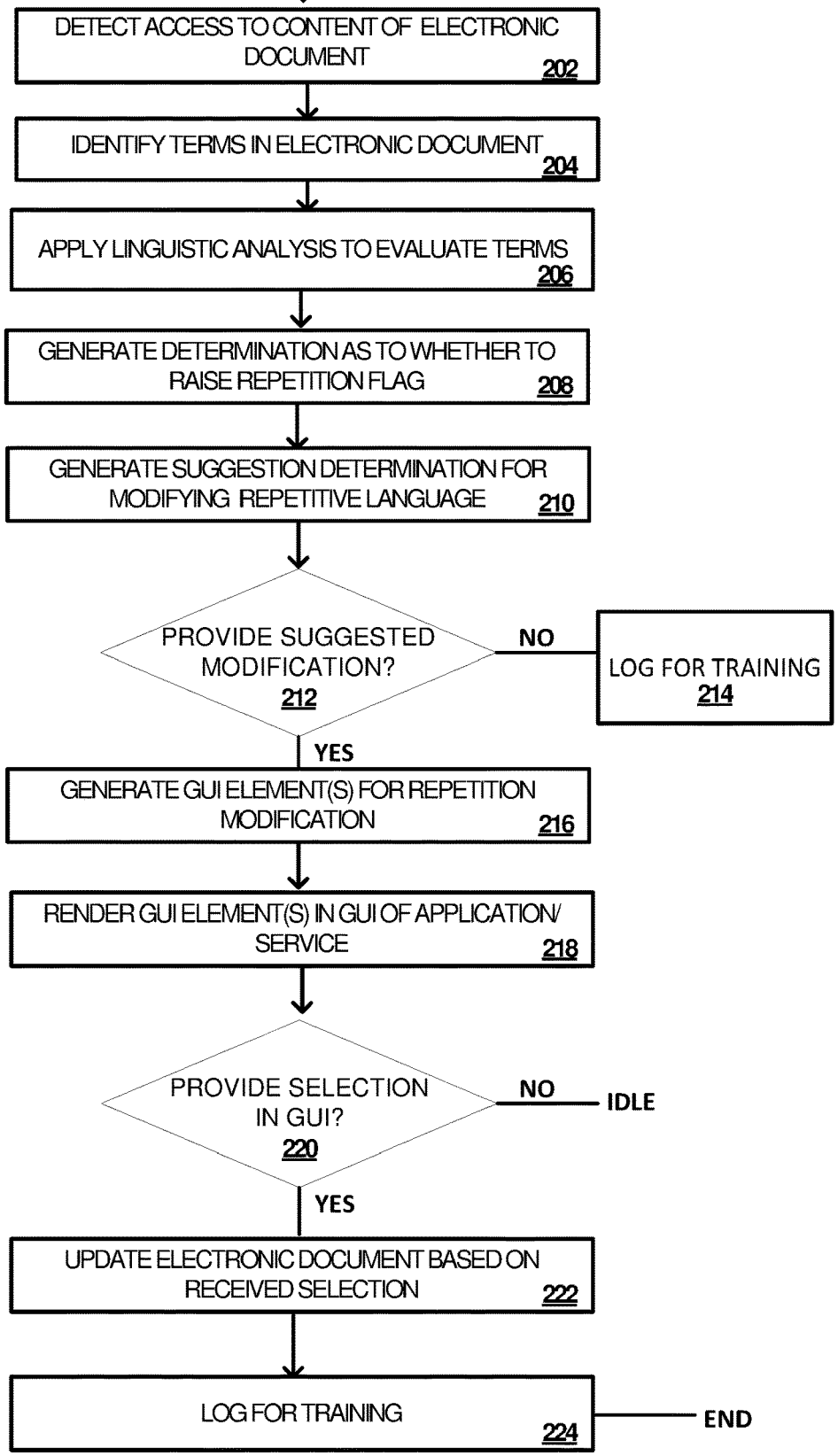

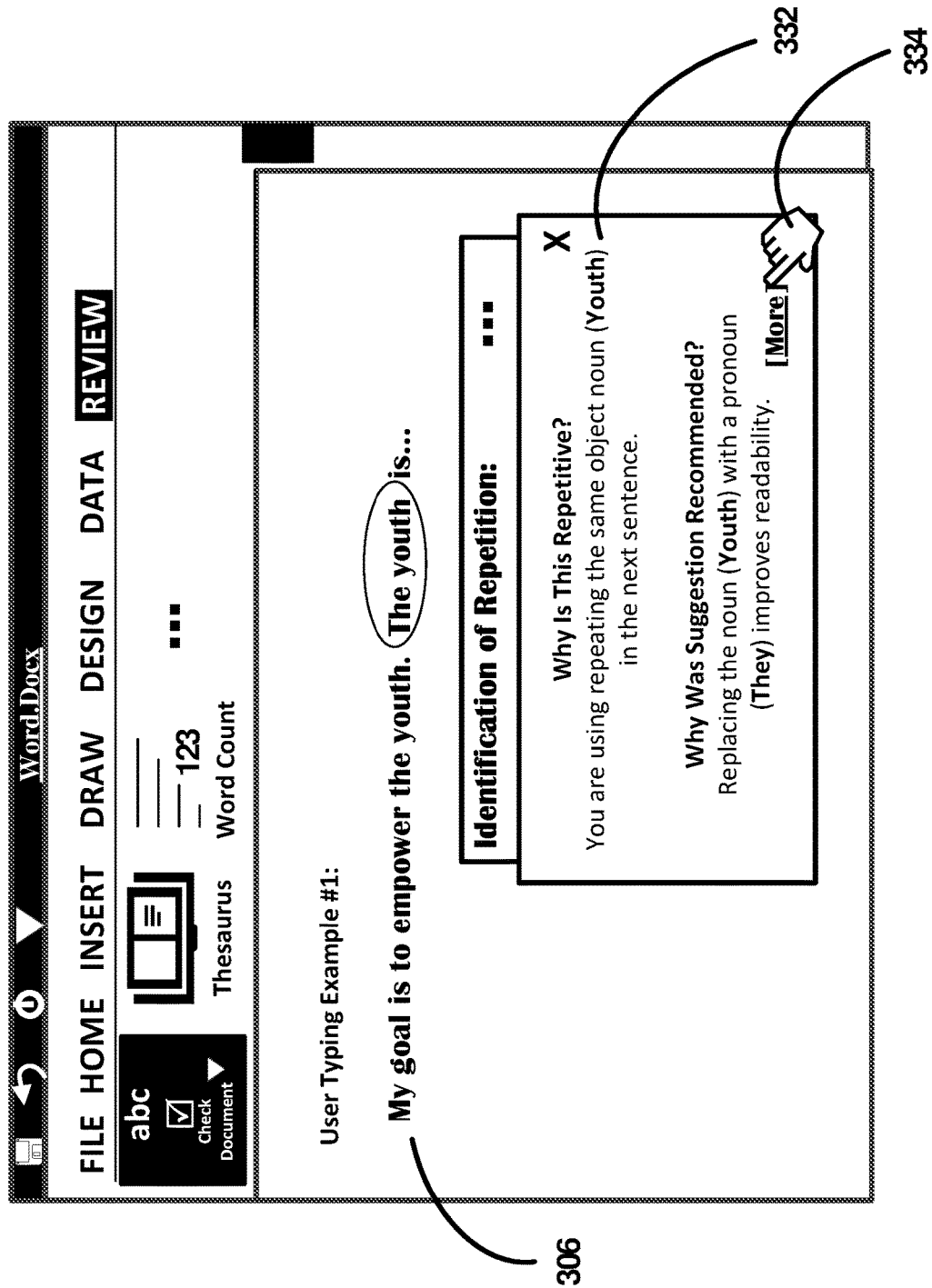

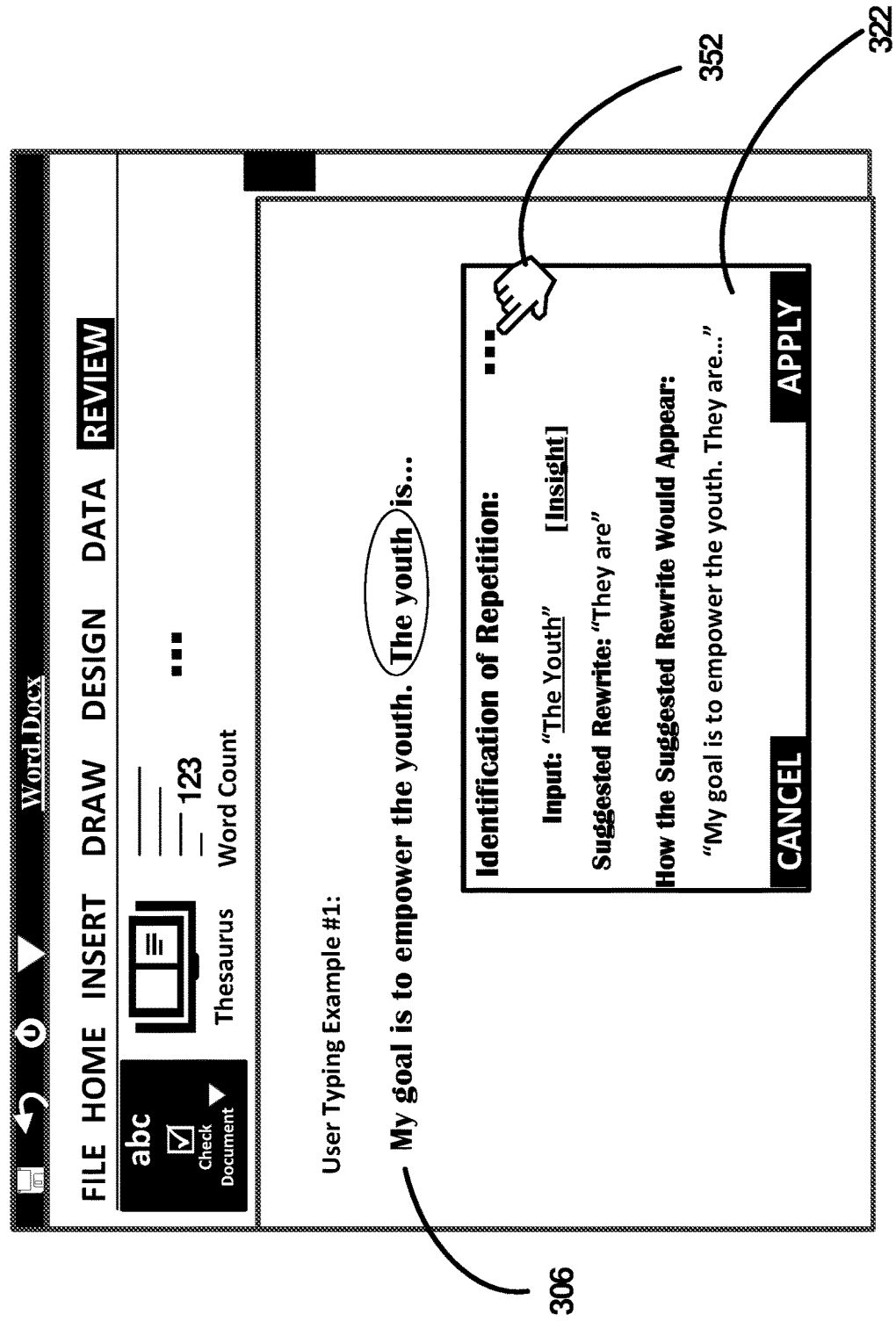

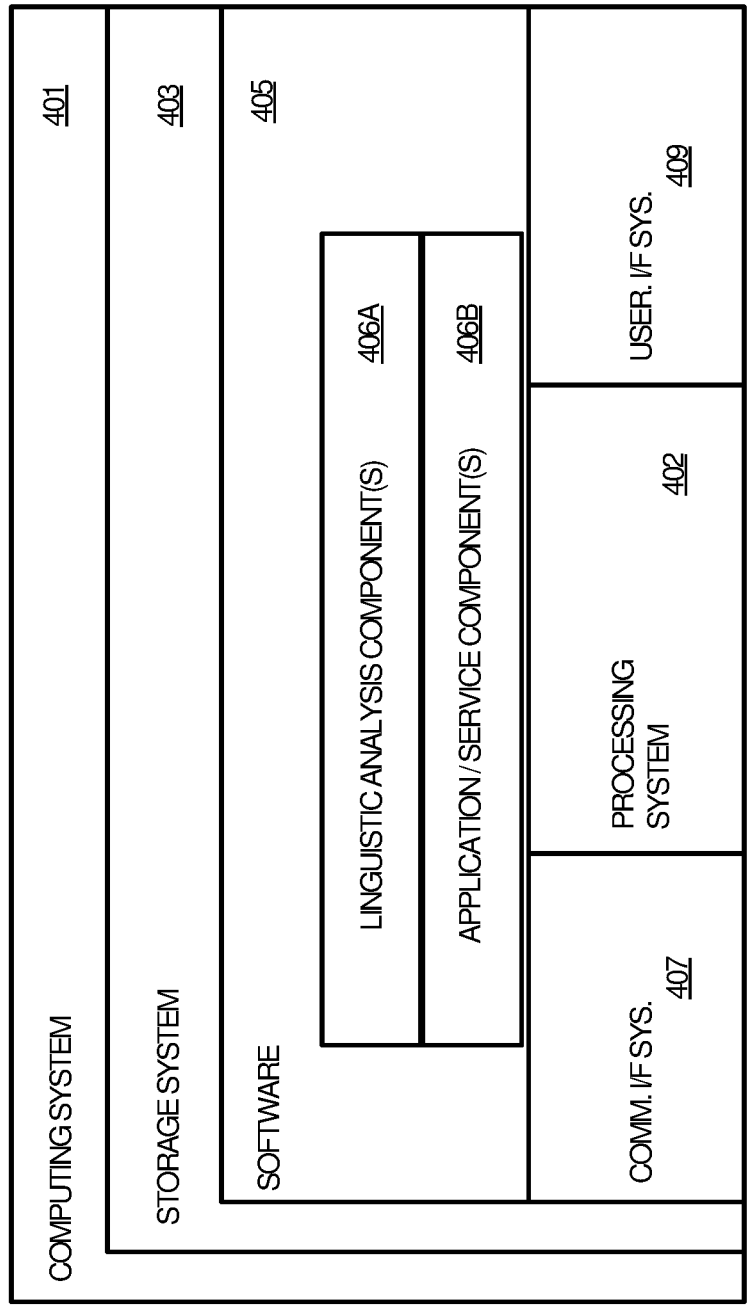

SYSTEMS AND METHODS FOR IDENTIFICATION OF REPETITIVE LANGUAGE IN DOCUMENT USING LINGUISTIC ANALYSIS AND CORRECTION THEREOF

BACKGROUND

Repetitive language is a common occurrence when a user is writing. Often, a user may be unaware that their writing includes repetitive language and thus rely on grammar correction to identify and correct repetitive language. Traditional methods of identifying repetitive language use a general word count and/or string-based evaluation of content. For instance, a word count may be applied where if a word repeats in a document that repetitive word may be identified by analyzing the content of the document. As such, a word count can be utilized to tell a user how often (i.e., how many times) a word appeared in a document. Taking things further, some traditional string-based evaluation methods may evaluate proximity of strings of words in a comparative manner but nonetheless are limited to evaluating whether similar strings exist (i.e., n-grams in strings). Ultimately, in either instance, the user is still limited by its knowledge of a language in order to understand how to best remediate repetition even when a suggestion is provided for remediation. This does not result in the most accurate identification or correction of repetition/excessive use of terms.

While application of word counts and string-based evaluation may be useful to a user for some technical purposes, it may miss the mark on identifying whether language is truly repetitive (or not). For instance, a same term may be used in two consecutive sentences but not be repetitive to a native speaker of a language. In the traditional examples where word count and/or string-based evaluation may be applied, a false positive identification of repetitive language is likely to occur where language may not actually be repetitive but was identified as being repetitive/excessive. In such cases, unnecessary corrections may be applied to content. This is largely due to surface-level analysis provided by those traditional methods which do not truly evaluate linguistic aspects of terms of a string. In other instances, traditional language checks identify repetitions only when exact matches occur. This can cause traditional systems to miss repetitions that may have a flexible variation in how terms are used and combined. For example, traditional language checks may not identify an instance of repetitive language in the sentence "I like sparkling white wine but I do not like sparkling red wine," because the usages of "like sparkling wine" appear different due to the inclusion of antecedent terms (e.g., white, red).

Additionally, because traditional methods of identifying repetitive language do not provide a linguistic-based understanding of terms in strings, the suggestions/recommendations for remediation of repetitive/excessive language typically suffer. In some instances, only one type of correction is provided (i.e., replace a word with a synonym). In most cases, this may not even be the most appropriate correction for a repetition because a linguistic understanding of terms in a string was not conducted and a variety of corrections was not considered.

As such, there is a technical need for the present disclosure which solves the technical problems previously identified with traditional methods in the identification and remediation of repetitive language/excessively used terms.

SUMMARY

In view of the foregoing technical challenges, the present disclosure relates to processing operations configured to provide a linguistic-based approach to evaluating repetition in content of an electronic document. The approach of the present disclosure is about detecting terms/words/phrases that are likely to be perceived as being repetitious by native speakers of a language rather than just identifying the occurrence of identical words or strings in a document as done by traditional language checks. In doing so, processing of the present disclosure detects and evaluates terms or phrases using positive linguistic evidence derived from evaluation of linguistic relationships between words in a string in syntactic ways. This results in more accurate and efficient determination as to whether a term is truly repetitious at the linguistic level as compared with traditional language checks. Specifically, when comparing processing of the present disclosure with string-based evaluation, fewer flags are raised for identification of repetitive/over-used language (including less false positives), but more precise/accurate identification of repetition occurs using processing of the present disclosure. Further examples described herein extend to management of remediation of repetitive/over-used language comprising but not limited to: determinations as to how to utilize content flagged as repetitious; determinations as to suggestions/recommendations for remediating flagged content; generation and presentation of data insights to aid user understanding in remediation of repetitive language; determinations as to whether to autocorrect flagged content; and generation of improved graphical user interface (GUI) elements to aid understanding including why content was flagged as being repetitive/over-used as well as providing better suggestions/recommendations for remediation, among other examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1A illustrates exemplary system diagram of components interfacing to enable linguistic analysis to be applied to improve processing configured for identifying and remediating repetitive language in an electronic document, with which aspects of the present disclosure may be practiced.

FIG. 1B illustrates an exemplary process flow providing non-limiting processing examples executed by a linguistic analysis component (described in FIG. 1A), with which aspects of the present disclosure may be practiced.

FIG. 2 illustrates an exemplary method related to identification and remediation of repetitive language in an electronic document, with which aspects of the present disclosure may be practiced.

FIGS. 3A-3G illustrate exemplary processing device views associated with user interface examples for an improved user interface of an application or service that is configured for management of repetitive language in an electronic document, with which aspects of the present disclosure may be practiced.

FIG. 4 illustrates a computing system suitable for implementing processing operations described herein related to management of repetitive language including identification and remediation thereof, with which aspects of the present disclosure may be practiced.

DETAILED DESCRIPTION

Figure 3A:
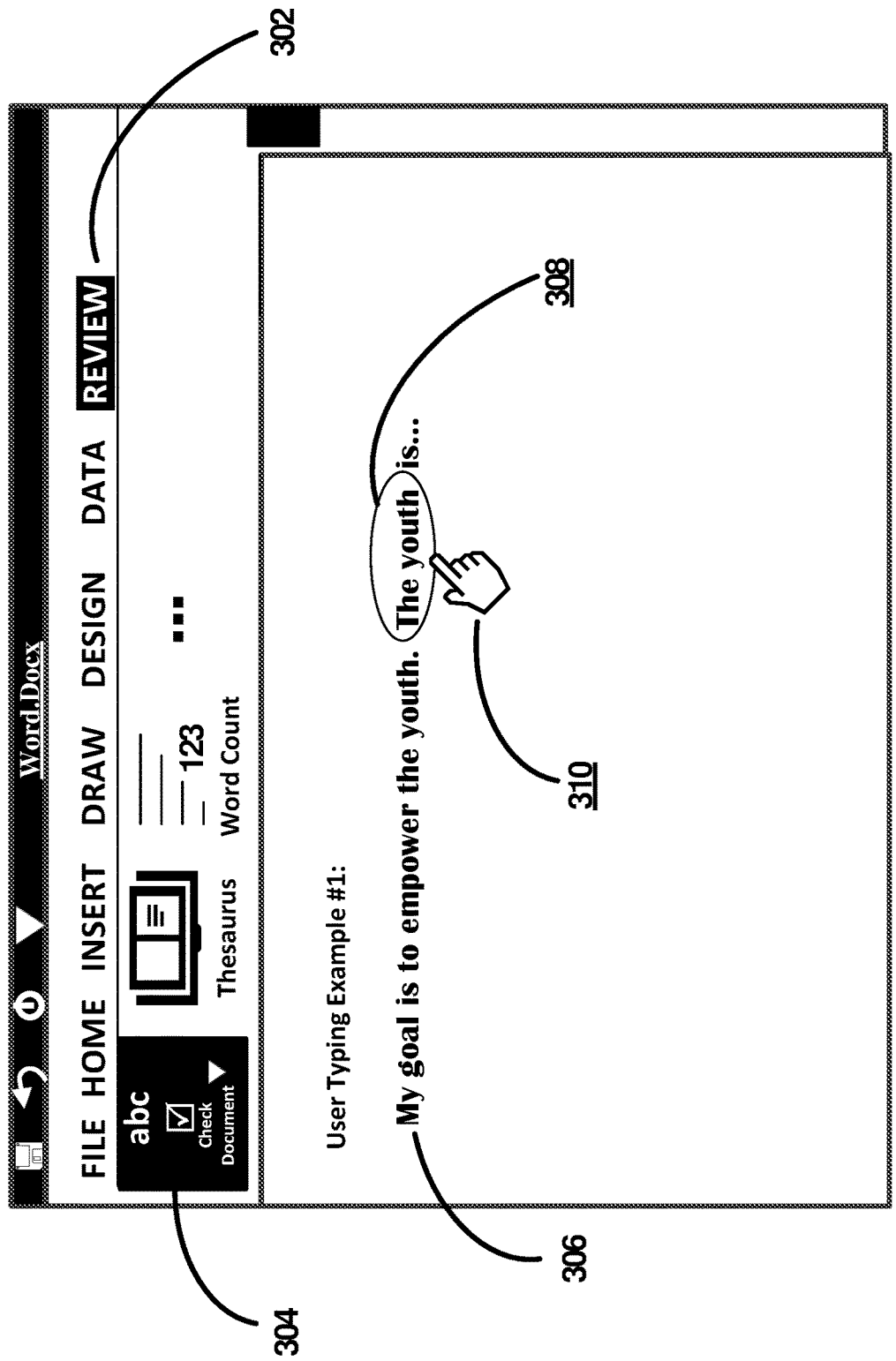

As referenced in the foregoing, the present disclosure relates to processing operations configured to provide a linguistic-based approach to evaluating repetition in content of an electronic document. The approach of the present disclosure is about detecting terms/words/phrases that are likely to be perceived as being repetitious by native speakers of a language rather than just identifying the occurrence of identical words or strings in a document as done by traditional language checks. In doing so, processing of the present disclosure detects and evaluates terms or phrases using positive linguistic evidence derived from evaluation of linguistic relationships between words in a string in syntactic ways. This results in more accurate and efficient determination as to whether a term is truly repetitious at the linguistic level as compared with traditional language checks. Specifically, when comparing processing of the present disclosure with string-based evaluation, fewer flags are raised for identification of repetitive/over-used language (including less false positives), but more precise/accurate identification of repetition occurs using processing of the present disclosure.

The following non-limited example shows you how linguistic analysis is relevant and provides technical advantages over traditional language checks, including string-based evaluation, in repetition evaluation (and word replacement) scenarios. Consider the following sentence groupings:

"John walked by my sister. My sister did not say hello."
"John walked by my brother. My brother did not say hello."

In the above sentences, traditional string-based evaluation may suggest replacing the beginning of each second sentence (e.g., "my sister", "my brother") with a pronoun (e.g., she, he) because each sentence scenario ended with the same terminology (i.e., "my sister", "my brother") which may be interpreted as being repetitive. However, linguistic analysis provided by the present disclosure provides a more detailed analysis that evaluates linguistic aspects of words in each sentence and/or group of sentences to determine syntactic relationships including the ways that sentences can be modified but still have the same meaning. This level of analysis yields a more accurate determination as to whether a term is actually repetitive to a native speaker of a language as well as provide more accurate suggestions as to how to best replace terms/phrases.

Still referencing the above sentence grouping example, using linguistic analysis to consider the second sentence scenario ("John walked by my brother") a linguistic-based determination may be the following. Replacing the second instance of "my brother" with "he" would cause confusion at a linguistic level where the reader may not be readily able to identify whether the person that "he" is referring to is John or his brother. As such, the second instance of "my brother" may be found to be not repetitive when linguistic analysis of the present disclosure is applied. Thus, while a replacement of "my sister" with "she" may work at a linguistic level (and be recommended to remedy repetition) in first sentence grouping, processing described herein is intelligently trained to understand not to flag a repetition in the second sentence grouping. In some alternative examples, while processing may not necessarily flag this issue for repetition correction, trained processing may still be applied to identify language that may improve a sentence structure/flow. For instance, a suggested correction may still be recommended to a user to help identify where confusing language is used and ultimately improve the users' writing.

Further examples described herein extend to management of remediation of repetitive/over-used language. This includes technical improvements in back-end processing (e.g., deterministic/predictive evaluations by one or more components) as well front-end processing (e.g., an improved GUI). Non-limiting examples of processing described herein related to management of remediation of repetitive/over-used language comprise but are not limited to: determinations as to how to utilize content flagged as repetitious; determinations as to suggestions/recommendations for remediating flagged content; generation and presentation of data insights to aid user understanding in remediation of repetitive language; determinations as to whether to auto-correct flagged content; and generation of improved graphical user interface (GUI) elements to aid understanding of why content was flagged as being repetitive/over-used as well as providing better suggestions/recommendations for remediation, among other examples. Moreover, the present disclosure may integrate processing components with a plurality of computing resources of a distributed software platform provided by a technology organization (e.g., Microsoft®, Google®, Apple®, IBM®), whereby processing described herein can be extended to provide contextually relevant processing for users. For instance, user writing styles may vary, where signal data from one or more users can be analyzed and utilized to provide richer insights that may help a user improve its writing style. This may comprise inclusion of data analytics that are specific to a user or even a group of users (e.g., comparatively with a specific user). Further, a distributed software platform may interface with processing components described herein to provide access to more expansive data repositories thereby improving processing results. Examples of such data repositories comprising but are not limited to: language understanding libraries; artificial intelligence (AI) training and modeling; log data including collected signal data; and telemetry analysis applications/services, among other examples.

Exemplary technical advantages provided by processing described in the present disclosure comprise but are not limited to: enhancement of processing efficiency during real-time (or near real-time) access to an electronic document for identification of repetitive/over-used language; improved processing efficiency (e.g., reduction in processing cycles, saving resources/bandwidth) for computing devices when generating suggestions/recommendations for remediating content flagged for repetition; ability to intelligently determine whether to autocorrect content flagged for repetition on behalf of a user; adapting and improving a GUI of an application/service to provide better identification of repetitive language and customized user interface menus/GUI elements for remediation thereof; reduction in latency through efficiently programmed/trained processing when identifying and analyzing repetitive language; generating a novel linguistic analysis component that is further configured to interface with a plurality of applications/services (e.g., applications/services of a distributed software platform) to extend functionality during processing; improved accuracy in flagging repetitive/over-used language in an electronic document; improved ability to identify linguistic rationale for why content is flagged as repetitive/over-used; improved ability to provide most appropriate suggestions/recommendations for modifying content that is found to be repetitive/over-used; and improving usability of applications/services for users, among other technical advantages.

FIG. 1A illustrates exemplary system diagram 100 of components interfacing to enable linguistic analysis to be applied to improve processing configured for identifying and remediating repetitive language in an electronic document, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in process flow 120 (FIG. 1B), method 200 (FIG. 2), processing associated with visual diagrams of FIGS. 3A-3G and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform that also provides, to a component, access to and knowledge of other components that are associated with applications/services. In one instance, processing operations described in system diagram 100 may be implemented by one or more components connected over a distributed network, where a user account (e.g., administrative user account) may be working with a specific profile established through a software data platform. System diagram 100 comprises a user computing device 102; an application/service component 104; a linguistic analysis component 106; a component 108 providing programmed software module/trained AI processing; and knowledge repositories 110.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used to execute any type of task including document creation and/or modification. An application/service that the user is accessing is configured to provide a user interface or GUI that enables access to and creation/modification of electronic documents. Exemplary functionality described herein including an improved user interface may be provided through an application/service component 104 that is configured to enable applications/services to be accessed by users and presented on a user computing device 102. An example user interface may be adapted to provide new functionality described herein, where back-end processing as well as front-end user interface features and application command control are described that is not present in traditional user interface systems. Intelligent processing operations are described herein that enhance the identification and remediation of repetitive/over-used language in an electronic document. Processing device views that illustrate non-limiting user interface examples of the present disclosure are provided in FIGS. 3A-3G.

An electronic document (or electronic file) is a representation of content in an electronic media/electronic format such as a digital file. Examples of electronic documents may vary, where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. Electronic documents may also include message content examples such as email messages, instant text messages and social media postings, among other examples. As a non-limiting example, an electronic document may be a word processing document, where access is provided through a word processing application/service, distributed storage, etc. In that example, content of the word processing document may be evaluated to determine when and how to apply autocorrections as well as provide review insight on behalf of users.

As referenced above, exemplary applications/services may interface with other components of process flow 100 to enhance processing efficiency and functionality as described herein. The application/service component 104 is configured to interface with other components of process flow 100 including computing device(s) 102 and the linguistic analysis component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). Moreover, specific application/services (including those of a distributed software platform) may be configured to interface with other non-proprietary application/services (e.g., third-party applications/services) to extend functionality including data transformation and associated implementation.

The application/service component 104 is configured to interface with user (through the user computing device 102) as well as the linguistic analysis component 106 and knowledge repositories 110 (e.g., of a distributed software platform). In doing so, signal data may be collected by either: the application/service component 104; or the linguistic analysis component 106 via the application/service component 104, to enable contextual processing of user access to an electronic document through one or more applications/services. Access to an electronic document may be a trigger to begin reviewing content for the ability to identify and remediate repetitive/over-used language in an electronic document. However, in some alternative examples, review of an electronic document for repetitive/over-used language may occur while a user is no longer accessing an electronic document (e.g., the user is offline). In such instances, processing described herein can be efficiently executed to thereby improve a subsequent user experience (e.g., when a user accesses the electronic document at a later point in time). It is important to note that any processing described herein is executed in compliance with data retention and data privacy laws, policy and regulations. In instances where processing occurs offline, no data is utilized in any manner that violates privacy laws, policy, regulations or user consent.

In one example, a framework for the application/service may be coded to detect user access and selection of user interface elements, etc., and respond accordingly. In other examples where the linguistic analysis component 106 is configured for detecting access through an application/service, an API or listener component may be utilized to trigger analysis of content of the electronic document. In some cases, the application/service component 104 is managing a user interaction with a single application/service and in other instances the application/service component 104 is managing a user interaction with multiple applications/services. As an example, detected access to the electronic document may be occurring in real-time by a user through the application/service, where analysis of content of the electronic document may occur in real-time as well.

The application/service component 104 is further configured to present, through interfacing with the linguistic analysis component 106, an adapted GUI that provides user notifications, GUI menus, GUI elements, etc., to manage the identification and remediation of content flagged as being repetitive/over-used. For instance, a GUI of an application/service may be configured to provide a user interface element notifies a user that repetitive language has been detected as well as GUI notifications that assist the user with remedying a repetitive language issue. In one example, a user interface element may be configured to initiate, when selected, presentation of GUI menus for reviewing content of an electronic document for repetitive language. An application command control (e.g., user interface ribbon) may be adapted to include a selectable user interface feature to initiate display of GUI menus to enable user control over processing described herein. In alternative examples, processing, by the linguistic analysis component 106, may be configured to automatically initiate (e.g., based on configurable setting that enables automatic processing to occur). In yet another example, an application/service may be configured to receive voice input, which may be a trigger for launch the user interface menu providing review insights into applied autocorrections. Non-limiting visual examples of user interface elements to launch the described user interface menu are provided in FIGS. 3A-3G.

The linguistic analysis component 106 is one or more components configured to manage identification and remediation of instances of repetitive/over-used language in content of an electronic document. In some examples, the linguistic analysis component 106 may be a component integrated within an application/service and in other examples the linguistic analysis component 106 operates independently and interfaces with the application/service component 104. The linguistic analysis component 106 executes processing operations that apply linguistic analysis in technical scenarios such as: 1) identifying terms in an electronic document; 2) identifying/flagging repetitions amongst the terms including; and 3) providing suggestions/recommendations for modifying instances of repetitive language. In doing so, the linguistic analysis component 106 is configured to utilize apply trained logic to evaluate syntactical dependencies between terms/words in a string and/or between multiple strings, among other type of linguistic data. A non-limiting example of syntactical evaluation occurring through the linguistic analysis component 106 is illustrated in process flow 120 (FIG. 1B).

In one technical instance, the linguistic analysis component 106 may be encoded as a software module programmed to execute processing operations described herein. This may comprise executing processing to parse an electronic document to identify terms/strings; identify syntactic relationships between the terms/strings; applying one or more first sets of linguistic rules to flag instances of repetitive language; and applying one or more second sets of linguistic rules to generate a remediation response, among other examples. In alternative examples, the linguistic analysis component 106 may be encoded as features in trained AI processing which may be configured to execute the same processing operations described above. In technical instances where trained AI processing is utilized, a corpus of annotated data may be generated and maintained to aid with processing operations described herein including the identification of syntactic dependencies (e.g., nodes, tuples) and the application of various sets of linguistic rules for identification of repetition and/or remediation thereof. In further examples, the linguistic analysis component 106 may be configured to execute some processing operations via encoded software program/module (e.g., parsing of electronic document and syntactical evaluation) and other processing operations (e.g., application of linguistic rules (e.g., first and second set), generation of flags and generation of remediation responses including GUI prompts) via trained AI processing.

Before linguistic analysis can be applied to improve identification and remediation of repetitive/over-used language, the linguistic analysis component 106 may be configured to parse an electronic document to identify terms therein. Parsing processing may comprise identifying terms/strings within the electronic document. This may be the first step to enabling positive linguistic evaluation of said terms. General processing operations for parsing content of an electronic document is known to one skilled in the field of art. This may comprise evaluation of content and/or metadata to identify specific sections of an electronic document including but not limited to paragraphs, sections, headers, footers, and titles, among other examples.

The appearance of repetitive language is often accompanying by the fact that the same/similar language is used for terms in close proximity to one another. Above what is traditionally known with parsing operations, the linguistic analysis component 106 may be configured to specifically parse portions/sections of an electronic document by applying linguistic analysis to identify terms, strings, etc., therefrom for repetition evaluation. This may comprise evaluating syntactic relationships between portions of content including terms, strings, paragraphs using a predetermined proximity window threshold. For instance, the linguistic analysis component 106 may apply a predetermined proximity window threshold (proximity threshold) that is used to identify specific portions of the electronic document in close proximity (e.g., sentence, group of sentences, paragraph) for repetition evaluation. A predetermined proximity window threshold as described herein may be a length/amount by which to identify repetition in a portion of an electronic document based on evaluation of linguistic relationships between terms and strings for one or more strings for the identified portions of the document. An exemplary predetermined proximity window threshold is utilized to identify terms in proximity to one another to best identify instances where a reader (e.g., native speaker of language) may likely perceive language as being repetitious if similar terms are used in the same sentence, few sentences, paragraph, etc. As an example, the predetermined proximity window threshold may be set to evaluate relationships between terms and strings in a single paragraph. However, the predetermined proximity window threshold may be set at any interval without departing from the spirit in the present disclosure.

As previously referenced, the linguistic analysis component 106 is configured to evaluate more than the frequency of occurrence of terms/words. While aspects such as frequency or other linguistic analysis (e.g., evaluation of lexical and/or prosodic features) may be applied to further aid determinations, the linguistic analysis component 106 may focus on evaluating syntactic dependencies between terms/phrases within the predetermined proximity window threshold individually or in combination with other aspects of analysis including but not limited to: frequency of terms/phrases; language understanding processing including evaluation of lexical and prosodic features, among other examples. The present disclosure provides numerous technical advantages over traditional methods of language checks including allowing flexibility in identifying repetitions as subsequently described. In one example, a repetition may be found to exist even in cases where repetition occurs through a different order of terms/words (e.g., the language used comes off as repetitious even though different words are used). In another example, linguistic analysis may determine that a term used repeatedly is not overly repetitious even though it may be used multiple times in close proximity (e.g., multiple sentences or a paragraph). This may result in a term not being flagged as repetitious thereby providing advantages over string-based evaluation which may flag a word as repetitious when in fact linguistic analysis says it is not repetitive.

To provide the best possible linguistic analysis, evaluation of syntactic dependencies may occur at multiple points through the linguistic analysis process. For instance, linguistic-based analysis may be utilized by the linguistic analysis component 106 to break down one or more strings being evaluated into individual nodes. As an example, strings being evaluated may be strings extracted from a result of parsing an electronic document within a predetermined proximity window threshold. Nodes may identify a term and syntactic description pertaining to placement of the term in a string/phrase/sentence. For instance, a node (e.g., syntactical node) identifies a term/word from a language perspective. (e.g., part of speech) where nodes are identified for the part of speech of term/word in a string/phrase (e.g., identification of a term and a part of speech designation such as a verb node, noun node, prepositional phrase node). Identification of specific nodes, correspond with individual terms, can be utilized to identify the same or similar words in one or more proximate strings.

The linguistic analysis component 106 may further apply linguistic-based analysis to generate tuples from the identified nodes. An exemplary tuple is a finite sequence of nodes, where a tuple may comprise any number of nodes (e.g., 1, 2, 3, N) from the string/phrase or a flexible/alternative term/word derived from syntactic evaluation. As such, a non-limiting example of a tuple is a group of nodes. Linguistic-based analysis may create a grouping of nodes according to syntactic dependencies (e.g., tuple for a verb, tuple for verb combined with a prepositional phrase and a noun, tuple for verb combined with a prepositional phrase, noun and an adjective, etc.).

Tuples may be further usable to evaluate different aspects of one or more strings in different syntactic ways. As indicated above, the use of tuples and nodes further enable an additional level of syntactic abstraction for the one or more strings being evaluated. For instance, linguistic-based relationships between nodes/tuples can yield determinations of flexible/alternative terms that may be related enough to be interpreted as repetitive. A non-limiting example of this is the case where a node is created for the verb "talk" where flexible/alternative terms for the verb may comprise examples such as "talking," "talked", "talk to," etc. This may aid the linguistic analysis component 106 with identifying potentially repetitive language, for example, in cases where words may be similar but not exactly the same. Yet another level of abstraction that may occur is the identification of antecedents or postcedents for terms/words. For example, a word such as "unit" may have an antecedent description (e.g., "marginal unit" or "temperature unit") or postcedent description (e.g., "unit of mass"). As such, nodes and/or tuples may be created for such technical instances to aid the linguistic analysis component 106 in determining whether a term is repetitive or not.

The linguistic analysis component 106 may then be configured to evaluate identified strings and the determined tuples, including those created through syntactic abstraction, to look for linguistic patterns that are recognized as being relevant. Linguistic patterns are empirically identified by applying predetermined linguistic-based evaluation rules to evaluate syntactic relationships between string/string and corresponding tuples. That is, a first set (or sets) of linguistic rules may be applied which are configured for the purpose of determining whether to flag a term/phrase as an instance of repetitive language by applying linguistic rules to evaluate the strings and/or the determined tuples. A determination as to whether (or not) to raise a flag for identification of an instance of repetitive language may be made by the linguistic analysis component 106 based on a result of application of the first set (sets) of linguistic rules, where if the strings and/or corresponding tuples match a pattern identified in a linguistic rule then a repetition flag identifying a repetition may be raised. The first set/sets of linguistic rules may be configured to evaluate linguistic patterns that can be compared to evaluate the syntax (e.g., syntactic dependencies) of strings and/or determined tuples. This may comprise application of rules configured for specific purposes such as parsing terms of one or more strings (e.g., identify syntax) and then specific rules for evaluating relationships of syntactic relationships between terms. As referenced in the foregoing description, sets of linguistic rules are adaptably configured to evaluate terms within single strings (e.g., sentences) and/or terms in a sequence of multiple strings (e.g., multiple sentences). Ultimately, the scope of terms being evaluates may dependent on the length of content identified via the predetermined proximity window threshold.

For instance, application of the first set/sets of linguistic rules may comprise specific application of parsing rules that are used to identify and store types of syntactic constituents (e.g., nominal constituents, verbal constituents, subject-verb constituents within string/sentences). Once the structure of strings/sentences has been parsed and identified, the specific rules may be applied that comparatively evaluate syntactic relationships between terms in one or more strings/sentences. Non-limiting examples of exemplary linguistic rules that are used to evaluate syntactic relationships for flagging potentially repetitive language comprise but are not limited to the following:

- Term following cognate in same sentence (example: establish a physical establishment branch);
- Same subject-verb in adjacent sentences (example: We want action taken now! We want at least to see . . . );
- Same possessive-noun in adjacent sentences (example: Counterparts in your jurisdiction . . . branch in your jurisdiction);
- Same this-noun subject in nearby sentences (example: This modifier . . . It is approved . . . As an example, this modifier . . . );
- Bare singular object noun repeated in next sentence (example: The caps have not hurt liquidity . . . they have increased liquidity);
- Plural adjective-noun repeated at short distance (example: As for school-related absences . . . school-related absences are . . . ); and
- Plural noun repeated in comparison (example: Pets from the pound cost less than pets at a fancy pet store).

In some examples of application of the first set of linguistic rules may be aided by a comparison a corpus of annotated data (e.g., stored in knowledge repositories 110). For instance, a corpus of annotated data may be stored in a distributed data storage (e.g., web resources identified in FIG. 1A), which can be accessed for evaluation when applying the linguistic rules to determine whether to raise a flag identifying potentially repetitive language. In one example, the corpus of annotated data may comprise syntactically similar examples of the linguistic patterns identified in linguistic rules, where specific examples of linguistic patterns may be identified to aid parsing of terms as well as comparative evaluation thereof. In technical examples where trained AI processing (e.g. a trained machine learning model) is applied, the corpus of annotated data may be similarly utilized as training data to improve the efficiency and accuracy of the trained AI processing during runtime. Matching may occur that evaluates syntactic aspects, relationships, dependencies, etc., to correlate syntactic relationships associated with strings and/or determined tuples with specific linguistic patterns provided in applied linguistic rules. In some technical instance, a confidence level scoring (or other metric) may be generated through the trained AI processing that provides a deterministic analysis as to whether a determined tuple matches with syntactic information of a specific linguistic rule. Exemplary confidence scoring may be utilized to determine whether a repetition flag should be raised for a term/string. A threshold may further be set for determining a confidence level with respect to identification of a linguistic pattern in one or more proximate strings.

In technical instances where a repetitive is found in a constituent term, any associated dependencies (e.g., identified tuples) may be marked as repetitive as well. This may aid identification of repetitive language even when the actual terms/order of terms varies amongst strings. When a flag is raised identifying an instance of repetitive language, the linguistic analysis component 106 is configured to generate suggestion for modification of the instance of repetitive language. This may comprise application of linguistic-based analysis to determine the most appropriate remediation suggestion for the repetitive language based on evaluation of syntactic relationships identified from analysis of strings and/or dependencies (e.g., identified tuples). A determination as to how to remedy the instance of repetitive language may be made by the linguistic analysis component 106 based on a result of application of a second set of linguistic rules. Typically, traditional string-based evaluation would suggest replacing word with a synonym to correct repetition. However, linguistic analysis applied in the present disclosure may use results of syntactic evaluation to determine that replacing a word with a synonym is the correct response in only about thirteen percent of cases. As such, processing applies linguistic-based rules to determine a best possible linguistic correction to apply from among a plurality of applicable linguistic corrections. Non-limiting examples of linguistic corrections that may be applicable to remedy an instance of repetitive language comprise but are not limited to: replacement with a paraphrase; replacement with a pronoun; remove the word/term; replace with a synonym; restructure the phrase; replace with a hypernym; and insertion of a new word/term, among other examples. The second set of linguistic rules may be linguistic patterns for exemplary linguistic corrections, where the second set of linguistic rules can be compared to evaluate the syntax including associated dependencies (e.g., strings and/or corresponding tuples) to select a most appropriate linguistic correction from that evaluation. Non-limiting examples of exemplary linguistic rules for remedying potentially repetitive language comprise but are not limited to the following:

- ReplaceWithParaphrase (For input of: " . . . do not have jobs . . . they have the job to study"; suggested rewrite: "their work is studying");
- ReplaceWithPronoun (For input of: " . . . empower the youth. The youth is . . . "; suggested rewrite: "they are");
- Remove (For input of: "current job profile . . . future job profile"; suggested rewrite: "profile");

ReplaceWithSynonym (For input of: "possible interpretations and possible fixes"; suggested rewrite: "potential");

RestructurePhrase (For input of: "cleaned my knee . . . to put it over my knee . . . "; suggested rewrite: "on");

ReplaceWithHypernym (For input of: "driven by pride. This pride can . . . "; suggested rewrite: "trait"); and Insert: (For input of: "I have a cat. I have a dog"; suggested rewrite: "I also have").

In some examples of application of the second set of linguistic rules may be aided by a comparison a corpus of annotated data (e.g., stored in knowledge repositories 110). For instance, a corpus of annotated data may be stored in a distributed data storage (e.g., web resources identified in FIG. 1A), which can be accessed for evaluation when applying the linguistic rules to determine whether the most appropriate suggestion/recommendation, insight, etc. In one example, the corpus of annotated data may comprise patterns that are similar from a syntactic standpoint, which may be parsed to help determine if the best suggestions/recommendations for remedying an instance of repetitive language. In technical examples where trained AI processing (e.g. a trained machine learning model) is applied, the corpus of annotated data may be similarly utilized as training data to improve the efficiency and accuracy of the trained AI processing during runtime. Matching may occur that evaluates syntactic aspects of terms and/or dependencies, relationships therebetween, etc., to linguistic patterns identified in rules that may be used to identify corrections. In some technical instance, a confidence level scoring (or other metric) may be generated through the trained AI processing that provides a deterministic analysis as to whether a string and/or determined tuple matches with syntactic information of a specific linguistic rule. Exemplary confidence scoring may be utilized to determine scoring for selecting specific suggestions/recommendations, insights, etc.

Furthermore, the linguistic analysis component 106 may be configured to generate and/or render GUI elements (including menus, prompts, notifications links, etc.) that are configured to aid management of an identified instance of potentially repetitive language. In doing so, the linguistic analysis component 106 interfaces with other components such as the application/service component 104, the component 108 providing programmed software module/trained AI processing and knowledge repositories 110, which are utilized to enhance processing for identifying and remedying repetitive/over-used language in the electronic document. For example, the linguistic analysis component 106 interfaces with the application/service component 104 to generate GUI notifications that may be provided through an application/service (e.g., via interfacing with the application/service component 104). Moreover, the present disclosure may integrate processing components with a plurality of computing resources of a distributed software platform provided by a technology organization (e.g., Microsoft®, Google®, Apple®, IBM®), whereby processing described herein can be extended to provide contextually relevant processing for users. For instance, user writing styles may vary, where signal data from one or more users can be analyzed and utilized to provide richer insights that may help a user improve its writing style. This may comprise inclusion of data analytics that are specific to a user or even a group of users (e.g., comparatively with a specific user). Further, a distributed software platform may interface with processing components described herein to provide access to more expansive data repositories thereby improving processing results. Examples of such data repositories comprising but are not limited to: language understanding libraries; artificial intelligence (AI) training and modeling; log data including collected signal data; and telemetry analysis applications/services, among other examples. For instance, active and/or past user signal data may be utilized to aid any determinations made by the linguistic analysis component 106 including but not limited to: determination to flag specific types of language (e.g., terms/strings) as repetitive language; preferences for suggestions/recommendations including style/layout and/or preferred information to include therein; specific data insights that may be most relevant to a user (e.g., to improve user writing style); and preferences for autocorrection application, among other examples. In some instances, user signal data may comprise user selections/indications such as through a GUI of an application/service, which may provide an indication of user preferences. Non-limiting examples of such types of selections indications may comprise but are not limited to: user device information for form factor preferences; selections of GUI elements including features provided through an application command control; user feedback on the accuracy of identification of repetitive language; and user feedback on accuracy of suggestions for remediation, among other examples.

In generating of GUI elements for identification of repetitive language and/or remediation thereof, the linguistic analysis component 106 may select specific content to include in a notification, suggestion/recommendation, autocorrection, etc. In some instance, developer may set a predetermined format for specific types of notifications provided through a GUI (or other modality and in other instances a format may vary based on result of contextual analysis (e.g., by trained AI processing) that may factor in context of a user (e.g., via evaluation of signal data of one or more users). As referenced in the foregoing description, providing rewrites for repetitive language is a challenging and error-prone task. As a non-limiting example, a repetition modification suggestion may be provided as an instruction (e.g., replace term with "X", insert/remove "term X"). Instructions provided therein may be disjunctive (e.g., replace term "X" with a synonym or pronoun). In further examples, instructions provided though a GUI may be generated in a manner that is intuitive for user understanding and easily actionable for modifying repetitive language. For instance, a repetition modification suggestion may comprise: an identification of an instance of repetitive language and a suggested correction to remedy the instance of repetitive language. In further instances, the repetition modification suggestion may comprise other elements such as identification of a linguistic rationale as to why the instance of repetitive language is considered repetitious based on the result of the linguistic-based analysis, data insights/telemetric data; identification of relevant user signal data; and links for GUI control through one or more GUI menus/different types of content, among other examples.

In further examples, the linguistic analysis component 106 may be configured to generate additional determinations which may aid action to remedy repetitive language. Example of such determinations may comprise but are not limited to: determinations as to whether to apply an autocorrection of repetitive language; and determinations as to a timing of when to surface notifications including identifications of repetitive language, data insights to improve user writing style/language; and determination as to when to surface suggestions/recommendations, among other examples. For instance, in technical examples where trained AI processing is applied, signal data (e.g., identifying user preferences, deterministic from past user action) can be analyzed to aid any of those determinations. An example of such is the use of signal data indicating user preferences to determine when a notification is to be provided (e.g., user prefers to type a full sentence before seeing an identification of repetitive language).

As referenced in the foregoing description, the linguistic analysis component 106 is configured to execute processing operations thereof via a programmed software module, trained AI processing (e.g., application of a trained machine learning model) or a combination thereof. As such, the linguistic analysis component 106 interfaces with a component 108 providing programmed software module/trained AI processing. The component 108 may be its own programmed software module, application/service, etc., that is configured for execution of processing operations described herein to provide the linguistic analysis component 106 with exemplary determinations (or the ability to derived determinations on its own).

In cases where trained AI processing is applied, general application of trained AI processing (including implementation of machine learning) including creation, training and update thereof is known to one skilled the field of art. Above what is traditionally known, trained AI processing may be adapted to execute specific determinations described herein with reference to the linguistic analysis component 106. Exemplary AI processing may be applicable to aid any type of determinative or predictive processing by the linguistic analysis component 106, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM); and neural networks, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples.

Furthermore, a component 108 providing programmed software module/trained AI processing may be configured to apply a ranker to generate scoring to assist with any processing determinations by the linguistic analysis component 106. Non-limiting examples of application of confidence scoring for specific determinations has been provided in the foregoing description. As an example, confidence scoring may be specifically used to curate a listing of suggestions for remedying repetitive language, where an ordered listing of suggestions/recommendations for remediation may be provided to a user through a GUI. However, it is to be understood that confidence scoring and ranking can be applied for any type of determination described herein including but not limited to: application of autocorrections, selection of specific content to include in a notification and a timing of surfacing a notification on behalf of a user, among other examples.

As referenced in the foregoing description, knowledge repositories 110 may be accessed to obtain data for generation, training and implementation of the programmed software module/trained AI processing 108. Knowledge resources comprise any data affiliated with a software application platform (e.g., Microsoft®, Google®, Apple®, IBM®) as well as data that is obtained through interfacing with resources over a network connection including third-party applications/services. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing; machine learning accuracy models (e.g., internally managed by a provider of a software application platform and/or externally managed and accessed); web-based resources including any data accessible via network connection including data stored via distributed data storage; and application/service data (e.g., data of applications/services managed by the application/service component 104) for execution of specific applications/services including electronic document metadata, among other examples. As an example, the autocorrection generation component 106 is configured to interface with a document editing service to retrieve access to editing and proofreading resources to suggest candidate autocorrections. Moreover, knowledge repositories 110 may further comprise access to a cloud-assistance service that is configured to extend proofreading and editing capabilities to identify repetitive language and aid in remediation thereof. The cloud-assistance service may provide the linguistic analysis component 106 and/or application/service component 104 with access to larger and more robust library of stored data for execution of language checks including those described herein. Access to the cloud-assistance service may be provided when an application/service is accessing content in a distributed service-based example (e.g., a user is utilizing a network connection to access an application/service), as the data of the cloud-assistance service may be too large to store locally. Among other types of processing to aid the linguistic analysis component 106, the cloud-assistance service may execute processing operations such as language understanding processing; and applying resources for linguistic-based (e.g., syntactic and/or semantic) evaluation of content, among other examples. In further examples, the linguistic analysis component 106 may be configurable to interface with a web search service, entity relationship databases, etc., to extend a corpus of data to make the most informed decisions when generating determinations on behalf of a user. In even further examples, telemetry data may be collected, aggregated and correlated (e.g., by an interfacing application/service) to further provide the linguistic analysis component 106 with on demand access to telemetry data which can aid determinations generated thereby.

FIG. 1B illustrates an exemplary process flow 120 providing non-limiting processing examples executed by a linguistic analysis component 106 (as described in the description of FIG. 1A), with which aspects of the present disclosure may be practiced. Process flow 120 is intended to help visualize some aspects of syntactic evaluation that may occur to identify repetitive language and remedy identified instances thereof. Additional technical details regarding processing operations described in process flow 120 are provided in the description accompanying the other figures provided herein.

At processing operation 122, the linguistic analysis component 106 is configured to parse electronic document to identify terms. As referenced in the foregoing description, parsing processing may comprise identifying terms/strings within the electronic document and syntax of terms within one or more strings. This may be the first step to enabling positive linguistic evaluation of said terms. The linguistic analysis component 106 may be configured to identify terms in any manner previously references. In at least one instance, terms may be identified by applying linguistic analysis including syntactic evaluation of specific portions of content identified within a predetermined proximity window threshold.

Flow of process flow 120 may proceeding to processing operation 124, where the linguistic analysis component 106 is configured to identify nodes for terms identified. Processing operation 124 may comprise evaluating syntactic relationships between portions of content including terms, strings, paragraphs using a predetermined proximity window threshold as previously described. For instance, linguistic analysis may be utilized by the linguistic analysis component 106 to break down one or more strings being evaluated into individual nodes. Nodes may identify a term and syntactic description pertaining to placement of the term in a string/phrase/sentence. For instance, a node (e.g., syntactical node) identifies a term/word from a language perspective. (e.g., part of speech) where nodes are identified for linguistic constituents including the part of speech of term/word in a string/phrase (e.g., identification of a term and a part of speech designation such as a verb node, noun node, prepositional phrase node).

A high-level visual example of breaking down a string into nodes is shown in process flow 120 (below identification of processing operation 124). As can be seen in process flow 120, a sentence of "talking in a pub with friends" is syntactically evaluated, where each word of that sentence is identified as a node (e.g., "talking" "in" etc.). Moreover, syntactic evaluation of the example sentence further correlates each node with a part of speech. For instance, a first node for the word "talking" is identified as a verb in the context of the sentence; a second node "in" is classified as a preposition, a third node "a" is classified as a determiner/article, a fourth node of "pub" is classified as a noun, etc. Breaking down the sentence into individual nodes enables the linguistic analysis component 106 to continue the linguistic-based evaluation by further evaluating syntactical dependencies between terms/string including flexible terms/phrases that may be potentially repetitive. From a processing standpoint, identified nodes may be propagated for generating tuples.

Continuing the linguistic analysis, the linguistic analysis component 106 may proceed to processing operation 126, where exemplary tuples are generated. As referenced in the foregoing description, an exemplary tuple is a finite sequence of nodes, where a tuple may comprise any number of nodes (e.g., 1, 2, 3, N) from the string/phrase or a flexible/alternative term/word derived from syntactic evaluation. As such, a non-limiting example of a tuple is a group of nodes. Linguistic-based analysis may be applied to create a grouping of nodes according to syntactic dependencies (e.g., tuple for a verb, tuple for verb combined with a prepositional phrase and a noun, tuple for verb combined with a prepositional phrase, noun and an adjective, etc.). Tuples may be further usable to evaluate different aspects of one or more strings in different syntactical ways.

A high-level visual example of breaking utilizing identified nodes to generate tuples is shown in process flow 120 (below identification of processing operation 124). As can be seen in process flow 120, a continued evaluation occurs using the sentence "talking in a pub with friends." Further level of syntactical abstraction enables usage of the nodes to generate a plurality of different tuples, which range from one node (e.g., "talk") to a plurality of nodes ("talk, with, friend"). Moreover, additional syntactic abstraction may further yield flexible repetition identification as referenced in the foregoing description. Non-limiting examples of tuples that may be generated from the example sentence (as shown) comprise: "I talked yesterday with my friend" and "You will talk tomorrow with your friends." Incorporating tuples with flexible repetition identification expand the ability of the linguistic analysis component 106 to evaluate ways in which the sentence is repetitive with another string, sentence, phrase, etc. From a processing standpoint, generated tuples may be propagated for evaluation using set(s) of linguistic rules.

The linguistic analysis component 106 may then proceed to processing operation 128, where one or more sets of linguistic rules may be applied to generate determinations previously described. Non-limiting examples of determinations generated by the linguistic analysis component 106 comprise: a determination as to whether to raise a flag for identification an instance of repetitive language; and a determination as to suggestions/recommendations for remediation of flagged instances of repetitive language.

First, the linguistic analysis component 106 is configured to evaluate a string and/or generated tuples to identify linguistic patterns that are recognized as being relevant for the purpose of identifying whether a repetition flag should be raised. Linguistic patterns are empirically identified by applying predetermined linguistic rules to evaluate the strings and/or corresponding tuples. That is, a first set of linguistic rules may be configured for the purpose of determining whether to flag a term/phrase as repetitive language. A determination as to whether (or not) to raise a flag for identification of an instance of repetitive language may be made by the linguistic analysis component 106 based on a result of application of the first set of linguistic rules as previously described. The first set/sets of linguistic rules may be linguistic patterns that can be utilized to evaluate syntactic aspects of terms in one or strings, where rules may be specifically configured to aid with parsing of terms in one or more strings and comparative evaluation thereof.

In technical instances where a flag is raised identifying an instance of repetitive language, the linguistic analysis component 106 is then configured to generate suggestion for modification of the instance of repetitive language. This may comprise application of linguistic analysis to determine the most appropriate remediation suggestion for the repetitive language based on evaluation of syntactic relationships identified in strings and/or corresponding tuples. A determination as to how to remedy the instance of repetitive language may be made by the linguistic analysis component 106 based on a result of application of a second set of linguistic rules as described in the foregoing description.

FIG. 2 illustrates an exemplary method related to identification and remediation of repetitive language in an electronic document, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A) and process flow 120 (FIG. 1B). Operations performed in method 200 may correspond to operations executed by a system and/or service that execute computer modules/programs, software agents, application programming interfaces (APIs), plugins, AI processing including application of trained data models, intelligent bots, neural networks and/or machine-learning processing, among other examples. In one non-limiting example, processing operations described in method 200 may be executed by a component such as linguistic analysis component 106 (of FIG. 1A). In distributed examples, processing operations described in method 200 may be implemented by one or more components connected over a distributed network. For example, components may be executed on one or more network-enabled computing devices, connected over a distributed network, that enable a user to access an electronic document through an application/service as well as receive identification and suggested modifications for repetitive language therein. While some examples described herein reference examples in a word processing application/service, it is to be recognized that the present disclosure may be configured to work with any type of content accessed through any type of application/service without departing from the spirit of the present disclosure.

Method 200 begins at processing operation 202, where access to content of an electronic document is detected. A user (or group of users) may be accessing (or launch) an electronic document, where application of processing by an exemplary linguistic analysis component (e.g., linguistic analysis component 106 of FIG. 1A) may be configured to automatically begin analysis based on: detecting access to an electronic document or may alternatively be triggered by a manual user action. Non-limiting examples of user action comprise but are not limited to: a user action that selects of a GUI element triggering repetitive/over-used language analysis (e.g., GUI element configured to launch spelling and grammar check or specific GUI element configured to launch repetitive/over-used language evaluation); and user action with respect to content of an electronic document (e.g., user begins typing/editing sentences therein), among other examples.

Flow of method 200 may proceed to processing operation 204, where the electronic document is parsed to identify terms therein. Identification (processing operation 204) of terms may further comprise identifying strings in which terms are components of. For instance, parsing of an electronic document may evaluate content in portions identified by a predetermined proximity window threshold as referenced in the foregoing description. This may enable the linguistic analysis component to break down an electronic document into manageable portions and further intelligently apply linguistic-based analysis to focus attention for identifying repetitive language on strings of terms/phrases that are in close proximity to one another within the electronic document.

Once strings and terms thereof are identified, flow of method 200 may proceed to processing operation 206. At processing operation 206, linguistic analysis is applied to evaluate a syntax of terms in one or more strings of the terms within the predetermined proximity window threshold. As referenced in the foregoing description, the linguistic analysis component (106 of FIG. 1A) is configured to identify nodes corresponding to terms of a string/strings. Linguistic analysis may further be applied to utilize syntactic relationships between terms to generate tuples, which can be used to further processing to identify instances of repetitive language in an electronic document.

Processing 206 may comprise applying a plurality of linguistic analysis rules (e.g., first set of linguistic rules) that evaluate linguistic relationships between groupings of terms identified within the predetermined proximity window threshold. The linguistic-based analysis evaluates syntactic relationships between terms in one or more strings as well as associated dependencies (e.g., associated tuples) thereof. As identified in the foregoing description, generated tuples help to identify whether similar terms are used and variations in ways that similar terms can be used. When combined, a thorough linguistic evaluation may be performed that enables more accurate and precise identification of repetitive language via syntactic evaluation. A result of application of the first set of linguistic rules may be determined, where if the strings and/or corresponding tuples match a pattern identified in a linguistic rule then a potential instance of repetitive language is identified.

Flow of method 200 may proceed to processing operation 208. At processing operation 208, a determination is generated as to whether a repetition flag should be raised due to identification of an instance of repetitive language between two or more terms of strings within the predetermined proximity window threshold. In one example, a repetition flag is raised when syntactical evaluation of terms in proximate strings matches a linguistic pattern identified in one or more of the linguistic rules (e.g., of an exemplary first set of linguistic rules). In some alternative examples, a confidence scoring associated with a level of matching may be further utilized to aid a determination as to whether to raise a repetition flag. For example, trained AI processing may be applied to generate confidence scoring, where a confidence scoring indicating a match may be required to meet or exceed a threshold (e.g., greater than 60 percent) in order for a repetition flag to be raised.

Once a determination is made as to whether a repetition flag should be raised, flow may proceed to processing operation 210. At processing operation 210, a suggestion determination is generated as to whether to suggest a modification of an instance of repetitive language. The suggestion determination is generated (processing operation 210) based on a result of determining whether the repetition flag is raised (e.g., the determination generated in processing operation 208). Flow of method 200 may then proceed to decision operation 212, where it is determined whether to provide a suggested modification for an instance of repetitive language.

As indicated in the foregoing, a determination as to whether to provide a suggestion modification may be dependent on whether the repetition flag is raised. In examples where the repetition flag is not raised (i.e., the language is not repetitive at the linguistic level), flow of decision operation 212 branches NO and method 200 proceeds to processing operation 214. At processing operation 214, results of linguistic analysis may be logged for training. Even though an instance of repetitive language was not flagged does not mean that the specific instance of language cannot be used to aid training, especially in instances where trained AI processing (e.g., trained machine learning model) is being applied to generate determinations. In examples where data is logged for training, the linguistic analysis component 106 (FIG. 1A) may interface with the component 108 providing a programmed software module/trained AI processing (FIG. 1A) and/or the knowledge repositories 110 (FIG. 1A) to manage the logging of data (and subsequent updated of a trained model). Processing of method 200 may then remain idle until subsequent processing is to occur (or alternatively end).

In examples where the repetition flag is raised (i.e., an instance of repetitive language is identified at the linguistic level), flow of decision operation 212 branches YES and method 200 proceeds to processing operation 216. At processing operation 216, a repetition modification suggestion is generated based on the result of the linguistic analysis. Processing operation 216 may comprise generating GUI elements for inclusion of the repetition modification suggestion in a GUI of an application/service. Non-limiting examples of content/data included in GUI representation of the repetition modification suggestion have been provided in the foregoing description. Furthermore, visual examples of a repetition modification suggestion are provided in FIGS. 3A-3G. Generation of GUI elements for a repetition modification suggestion may occur through an interfacing between the linguistic analysis component 106 and an application/service component 104 (FIG. 1A), where the application/service component may be configured to control actual presentation of a GUI in which the repetition suggest modification is displayed. In some alternative examples, the linguistic analysis component is configured to generate and render GUI elements for display through a GUI of an application/service, where data for presenting a rendering may be propagated to an application/service.

Once the repetition modification suggestion is generated, flow of method 200 proceeds to processing operation 218. At processing operation 218, the repetition modification suggestion may be rendered for display/presented. This may comprise presenting an exemplary GUI element (or elements) through a GUI of an application/service. The repetition modification suggestion may comprise an identification of the instance of repetitive language and a suggested correction to remedy the repetitive language. In further examples, the repetition modification suggestion comprises identification of a linguistic rationale as to why the instance of repetitive language is considered repetitious based on the result of the linguistic analysis and/or data insights generated from analysis via the linguistic analysis component. A suggestion modification may comprise one or more suggestions for remedying an instance of repetitive language. In at least one example, this may comprise providing an ordered/ranked list of correction options, which are ordered/ranked based on a result of the linguistic analysis to a specific contextual instance that is being evaluated.

In some alternative examples, rendering of a repetition modification suggestion may comprise automatically applying an autocorrection of the instance of repetitive language. Autocorrection determinations may be generated by an exemplary linguistic analysis component. Specific technical instances where autocorrection may be applicable are included in the foregoing description as well as subsequently in the description of FIGS. 3F and 3G. If an autocorrection is applied on behalf of a user, an autocorrection notification may be generated and presented to a user to notify them of an automatically applied change. While the user may be able to recognize an autocorrection on their own, it may be useful to provide a user with insights into why an autocorrection was applied as well as enable them to easily undo an autocorrection if they choose. An exemplary autocorrection notification provide an identification of the autocorrection and an indication of a linguistic rationale as to why the autocorrection was automatically applied, among other and providing, through a graphical user interface (GUI) of an application or service, the autocorrection notification.

Flow of method 200 may proceed to decision operation 220. At decision operation 220, it is determined whether a user executes an action with respect to a provided GUI element (e.g., user selects a specific GUI element/feature). In examples where the no action is taken by the user with respect to a GUI element, flow of decision operation 220 branches NO and method 200 may then remain idle until subsequent processing is to occur (or alternatively end). In examples where an action is taken by the user with respect to a GUI element (e.g., user selects a specific GUI element/feature), flow of decision operation 220 branches YES and method 200 may then proceed to processing operation 222.

At processing operation 222, the electronic document is updated based on a result of selection received. For example, a user may select to apply a suggestion for remediating the instance of repetitive language, where processing operation 222 comprises replacing the repetitive language based on a result of the user selection.

Flow of method 200 may proceed to processing operation 224, where results of user activity (including interactions with GUI elements and user provided feedback) may be logged for training. In examples where data is logged for training, the linguistic analysis component 106 (FIG. 1A) may interface with the application/service component 104, the component 108 providing a programmed software module/trained AI processing (FIG. 1A) and/or the knowledge repositories 110 (FIG. 1A) to manage the logging of data (and subsequent updated of a trained model). Processing of method 200 may then end.

FIGS. 3A-3G illustrate exemplary processing device views associated with user interface examples for an improved user interface of an application or service that is configured for management of repetitive language in an electronic document, with which aspects of the present disclosure may be practiced. FIGS. 3A-3H provide non-limiting front-end examples of processing described in the foregoing including system diagram 100 (FIG. 1A), process flow 120 (FIG. 1B) and method 200 (FIG. 2).

FIG. 3A presents processing device view 300, illustrating a GUI of an application/service (e.g., word processing application/service) that is configured to enable identification and remediation of repetitive/over-used language. An application command control (e.g., GUI ribbon) may be provided through a GUI of an application/service to enable a user to manage an electronic document. In the example shown in processing device view 300, a GUI Feature for language review 302 is selected, thereby providing a GUI sub-menu that further provides different features/tools for evaluating language used in content of an electronic document. In the GUI sub-menu, a language check GUI feature 304 is activated enabling processing to occur in real-time (or near real-time) for analyzing content of the electronic document for instances of repetitive/over-used language. As referenced in the foregoing description, a linguistic analysis component 106 (of FIG. 1A) may be applied analyze content at a linguistic level to determine existence of instances of repetitive/over-used language.

Further shown in processing device view 300, a sentence group 306 (e.g., portions of 2 sentences) is provided in the electronic document (displayed in the GUI). The sentence group 306 is analyzed via back-end processing conducted by the linguistic analysis component, where a visual identification 308 is provided in the GUI flagging an instance of repetitive language (e.g., in the second sentence of the sentence group 306. In the example shown, the visual indication 308 identifies terms "the youth" in the start of the second sentence of the sentence group 306, where the same term ("the youth") was written to complete the first sentence of the sentence group 306. The user, through the GUI, may provide an action 310 pertaining to the visual indication 310, where the action 310 is configured to request more information about the flagged content. As an example, an action 310 may comprise a selection (e.g., via device, touch input, voice command) or hover over indication. However, the action 310 may be any type of input and method of entering input as known to one skilled in the field of art.

Figure 3B:
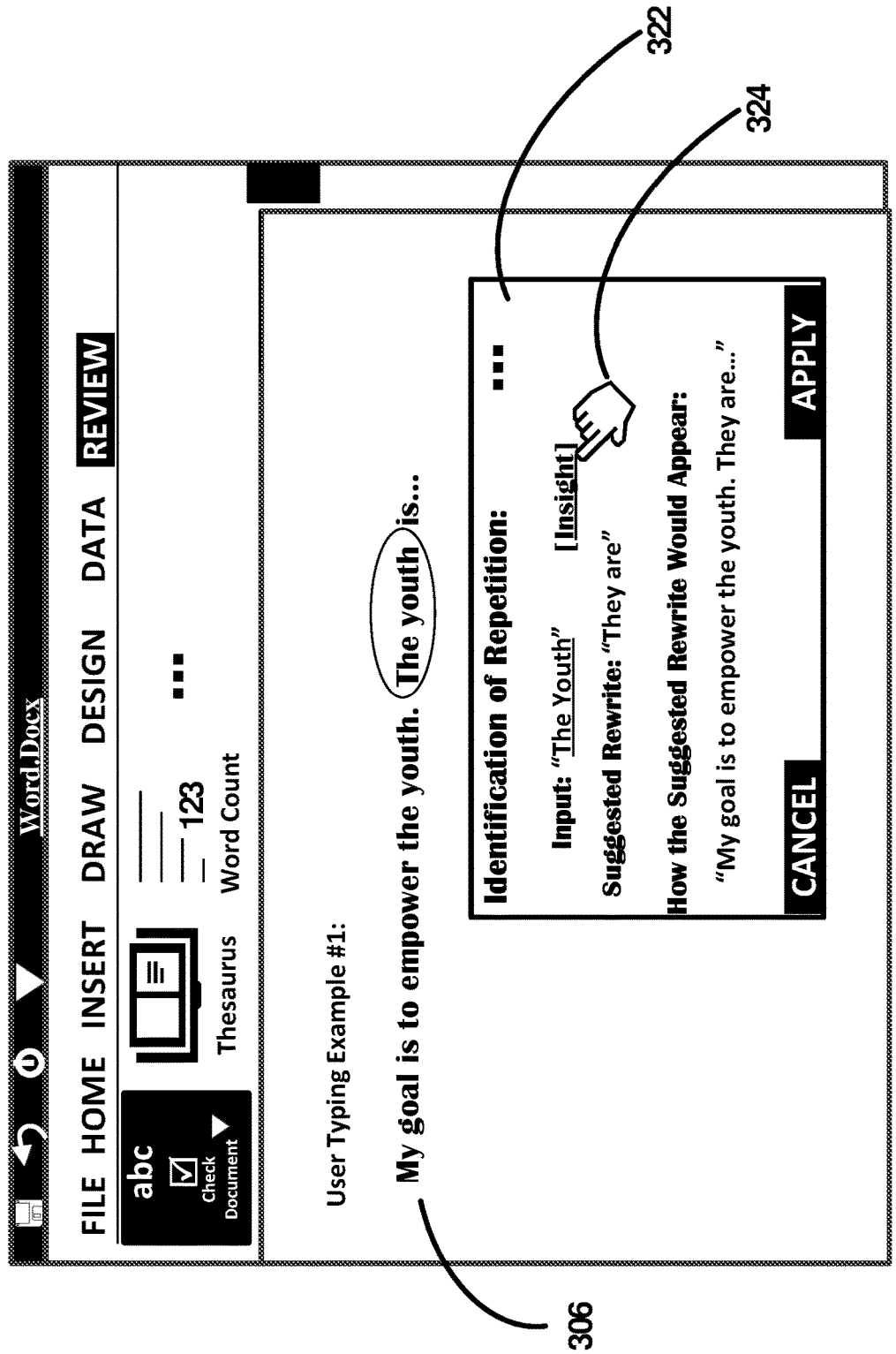

FIG. 3B presents processing device view 320, illustrating a continued example of the GUI of an application/service (e.g., word processing application/service) shown in processing device view 300 (FIG. 3A). In the example shown in processing device view 320, a GUI notification 322 is presented in response to a selection of the visual indication 310 (shown in FIG. 3A). The GUI notification 322 provides an exemplary repetition modification suggestion. Examples of a repetition modification suggestion have been described in the foregoing description, where processing device view 320 provides a non-limiting visual example of the repetition modification suggestion. The GUI notification 322 provides information pertaining to management of an identified instance of repetitive/over-used language, comprising: identification of an instance of repetitive language (e.g., input and suggested rewrite); identification of how a suggested rewrite would appear (if applied); GUI features for control over application of the suggested rewrite; and a link providing access to data insights associated with an identified instance of repetitive language. The user, through the GUI, may provide an action 324 selecting a link to view data insights provided in the GUI notification 322. This may trigger provision of one or more GUI elements providing data insights pertaining to the identified instance of repetitive language.

FIG. 3C presents processing device view 330, illustrating a continued example of the GUI of an application/service (e.g., word processing application/service) shown in processing device view 320 (FIG. 3B). In the example shown in processing device view 330, a GUI notification 332 is provided displaying data insights pertaining to the identified instance of repetitive/over-used language. The GUI notification 332 provides a data insight indicating a rationale as to why the terms were flagged as repetitive language. The rationale provides linguistic-based understanding for the user that is explained in relatable terms to help a user improve its writing. This may be provided as a result of syntactic evaluation of a string (or multiple strings) via the linguistic analysis component 106 (FIG. 1A). The user, through the GUI, may provide an action 334 selecting a link to view additional information data insights provided in the GUI notification 332. This may trigger provision of one or more GUI elements providing data insights pertaining to the identified instance of repetitive language.

Figure 3D:
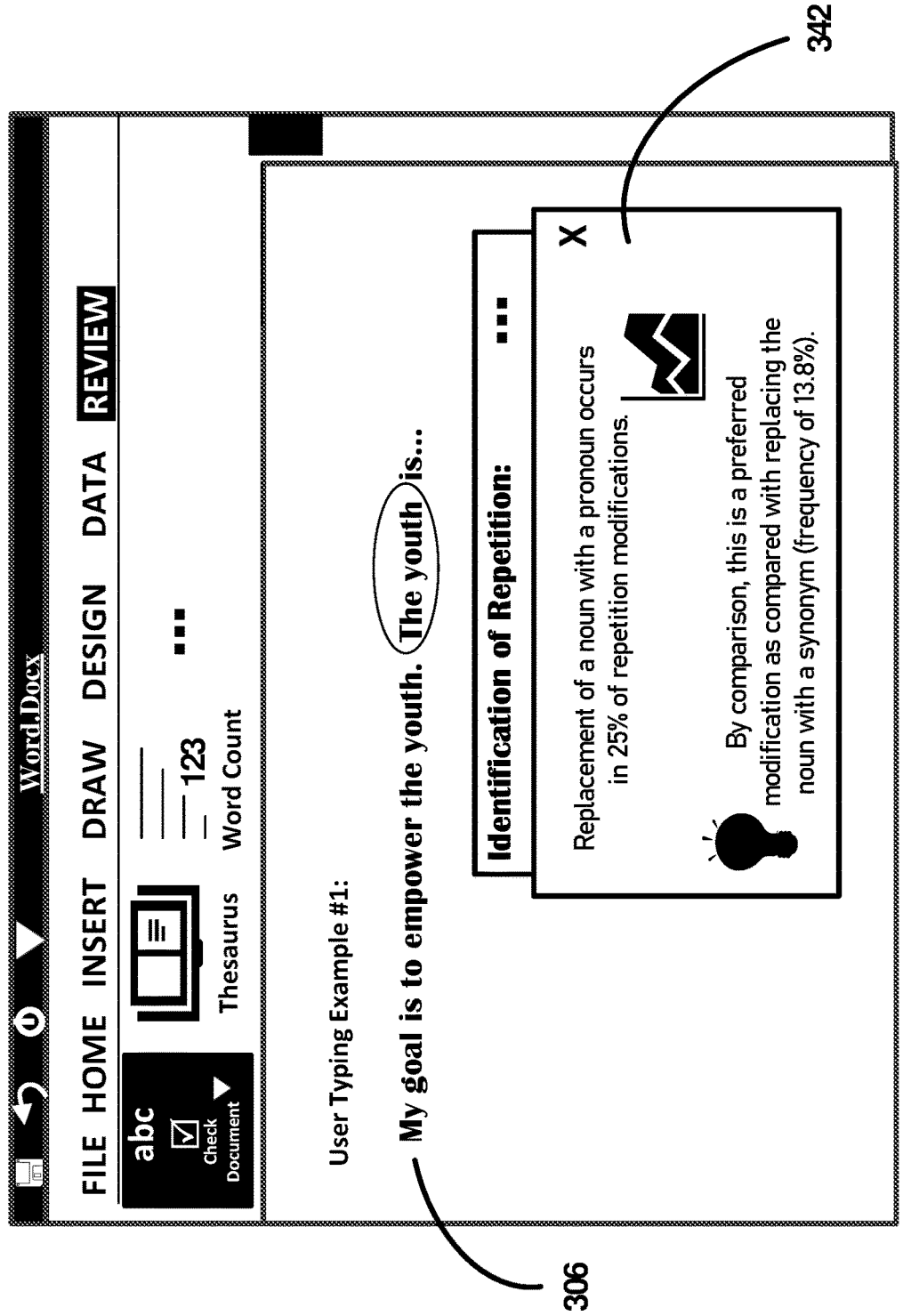

FIG. 3D presents processing device view 340, illustrating a continued example of the GUI of an application/service (e.g., word processing application/service) shown in processing device view 330 (FIG. 3C). As shown in processing device view 340, a GUI notification 342 is displayed providing telemetric analysis resulting from linguistic-based analysis of an instance of repetitive language. The GUI notification 342 provides data insights for the user to aid the user with understanding how syntactic evaluation may yield better suggestions for modifying repetitive language. For instance, telemetric data generated based on results of application of linguistic rules (e.g., an exemplary second set of linguistic rules) may be provided to a user through the GUI.

As referenced in the foregoing description, traditional string-based evaluation would typically suggest replacing word with a synonym to correct repetition. However, linguistic analysis may provide a richer determination as to how to best remedy an instance of repetitive language. For instance, linguistic analysis may determine that replacing a word with a synonym is the correct response in a small amount of cases. As such, processing applies rules to determine a best possible linguistic correction to apply from among a plurality of applicable linguistic corrections. GUI notification 342 provides a comparative analysis of frequency of use of one type of potential modification (e.g., replacement by pronoun) versus another type of potential modification (e.g., replace by synonym). Users may not be aware of such linguistic rationales, which may be used to help educate a user and improve subsequent writing when provided to the user through the GUI.

FIG. 3E presents processing device view 350, illustrating a continued example of the GUI of an application/service (e.g., word processing application/service) shown in processing device view 320 (FIG. 3B). The GUI notification 322 (identified in FIG. 3B) provides an exemplary repetition modification suggestion including information pertaining to management of an identified instance of repetitive/over-used language. The user, through the GUI, may provide an action 352 selecting a GUI feature (show an ellipses, " . . . ") which provides a link to view additional information pertaining to features usable to manage language checks pertaining to evaluation of repetitive/over-used language.

Figure 3F:
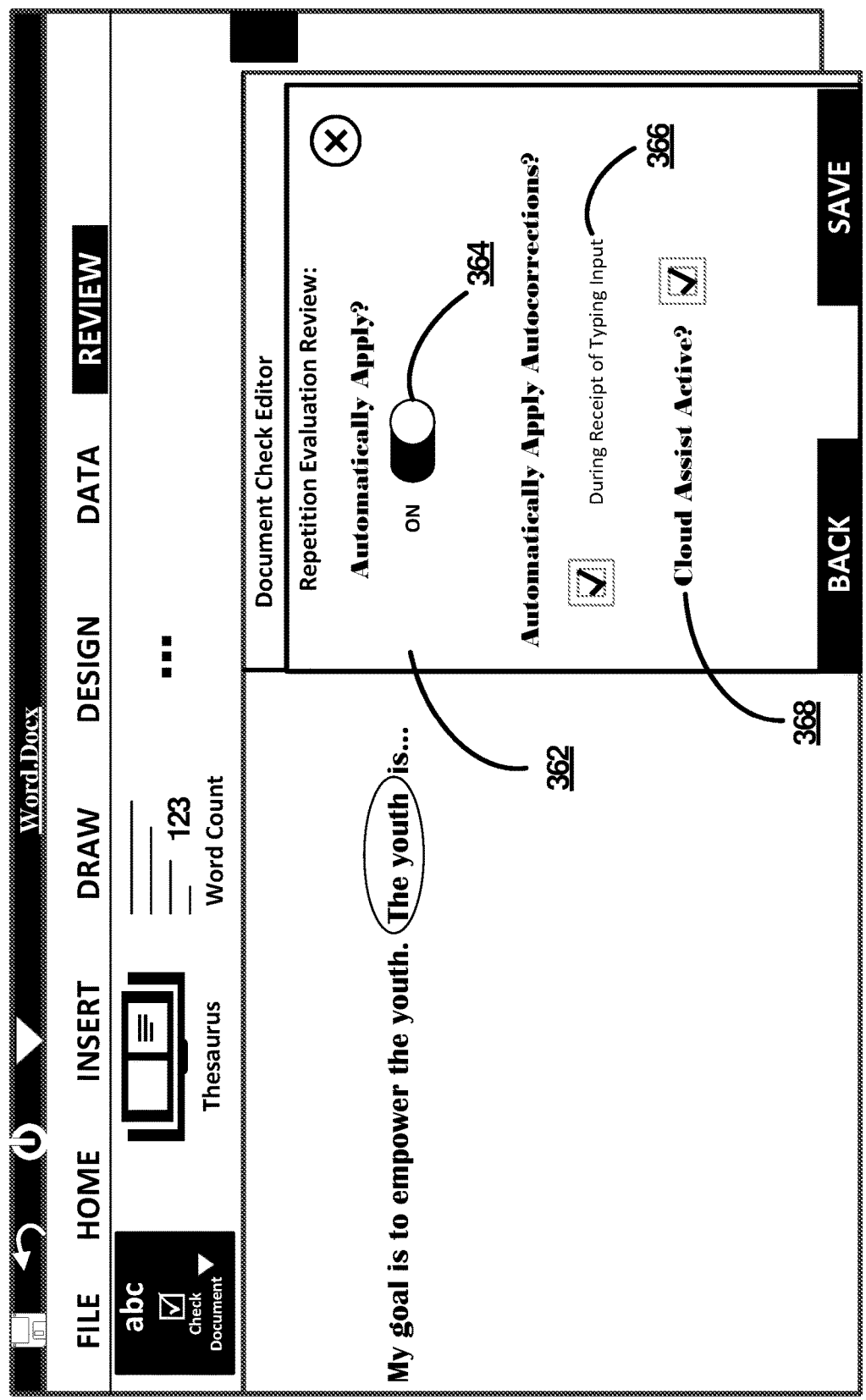

FIG. 3F presents processing device view 360, illustrating a continued example of the GUI of an application/service (e.g., word processing application/service) shown in processing device view 350 (FIG. 3E). Processing device view 360 provides a GUI menu 362 configured to display toggle control over features/services that may aid processing described herein. For instance, a user, through the GUI menu 362, is able to control toggling of features including but not limited to: automated application of repetition review; automatic application of autocorrections; and application of a cloud-assistance service, among other examples.

A first GUI control feature 364 provides a user with the ability to toggle (on/off) automated application of repetition review. The first GUI control feature 364 is configured to enable the user to control whether linguistic analysis is automatically applied (through the linguistic analysis component) during access to an electronic document or alternatively whether the user prefers to manually initiate repetition review (e.g., through the selection of review/language check features via the application command control).

A second GUI control feature 366 provides a user with the ability to toggle (on/off) automatic application of autocorrections. As referenced in the foregoing description, the linguistic analysis component may be configured to execute determinations as to whether to automatically apply autocorrections. The second GUI control feature 366 is configured to enable the user to control whether autocorrections are automatically applied or whether the user prefers to receive a suggestion notification for any modification of an identified instance of repetitive language and decide whether to apply a suggestion. In some technical instances, users may be further able to control the timing associated with application of autocorrections (e.g., during receipt of typing input).

A third GUI control feature 368 provides a user with the ability to toggle (on/off) application of a cloud-assistance service. The third GUI control feature 368 is configured to enable the user to control whether processing described herein is extended via access to a cloud-assistance service. As referenced in the foregoing description, knowledge repositories 110 (of FIG. 1A) may further comprise access to a cloud-assistance service that is configured to extend proofreading and editing capabilities to identify repetitive language and aid in remediation thereof. The cloud-assistance service may provide the linguistic analysis component 106 and/or application/service component 104 with access to larger and more robust library of stored data for execution of language checks including those described herein. Access to the cloud-assistance service may be provided when an application/service is accessing content in a distributed service-based example (e.g., a user is utilizing a network connection to access an application/service), as the data of the cloud-assistance service may be too large to store locally. Among other types of processing to aid the linguistic analysis component 106, the cloud-assistance service may execute processing operations such as language understanding processing; and applying resources for a linguistic-based evaluation of content, among other examples.

Figure 3G:
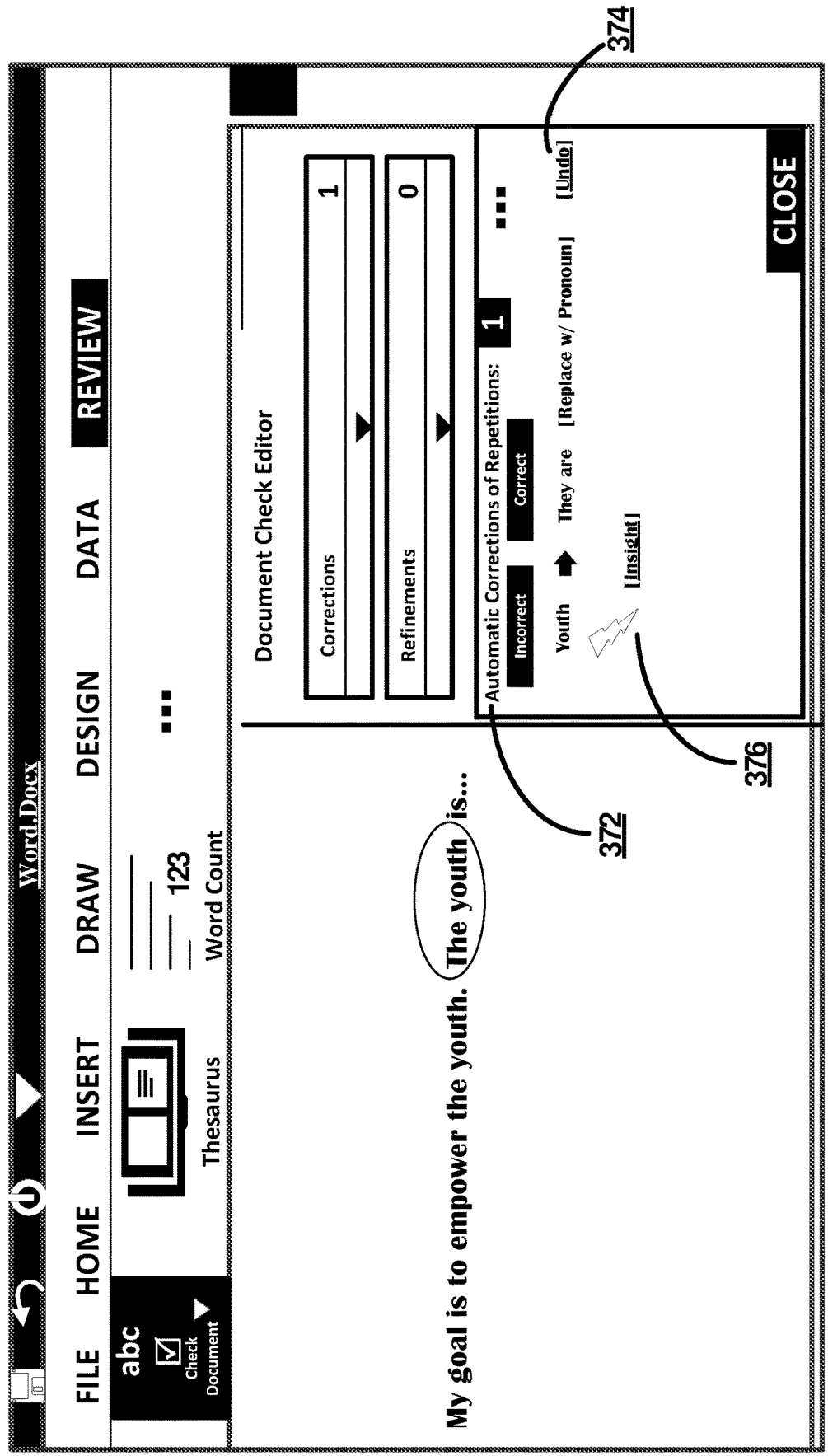

FIG. 3G presents processing device view 370, illustrating a continued example of the GUI of an application/service (e.g., word processing application/service) shown in processing device view 300 (FIG. 3A). As illustrated in processing device view 300, a GUI of an application/service (e.g., word processing application/service) that is configured to enable identification and remediation of repetitive/overused language.

Processing device view 370 provides a GUI menu 372 configured to manage the application of autocorrections to modify identified instances of repetitive language. For example, a user, through the GUI menu 372, is able to review and confirm an autocorrection of an identified instance of repetitive language. As an autocorrection may be automatically applied on behalf of a user, a GUI control feature 374 is provides that is configured to provide a user with a way to easily "undo" the autocorrection if desired. Other features provided through the GUI via the GUI menu 372 include but are not limited to: an ability to provide user feedback regarding the correctness of the applied autocorrection (e.g., "Correct" or "Incorrect"); identification of the identified instance of repetitive language; a correction automatically applied; a linguistic rationale for why the autocorrection was automatically applied; and the ability to provide data insights regarding an identified instance of repetitive language and application of autocorrections, among other examples. For instance, a GUI link 376 is provided that, when selected, results in the provision of data insights similar to the GUI examples provided in the foregoing processing device views.

FIG. 4 illustrates a computing system 401 suitable for implementing processing operations described herein related to management of repetitive language including identification and remediation thereof, with which aspects of the present disclosure may be practiced. As referenced above, computing system 401 may be configured to implement processing operations of any component described herein including the linguistic analysis component(s). As such, computing system 401 may be configured to execute specific processing operations to solve the technical problems described herein, whereby processing operations are executed to improve processing with respect to identification of repetitive language in an electronic document and provision of suggestions/corrections to improve the readability of the electronic document by modifying the repetitive language. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), process flow 120 (FIG. 1B), processing operations described in method 200 (FIG. 2) and/or the accompanying description of FIGS. 3A-3G.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more linguistic analysis component(s) 406a as described herein. Software 405 may further comprise application/service component(s) 406b that provide applications/services as described in the foregoing description such as applications/services that enable user access to electronic documents and/or those which enable notifications through a GUI, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: application command control specifically configured for managing repetitive language in an electronic document; and an improved GUI providing notifications to manage repetitive language including but not limited to: specific GUI elements configured to provide identification of potential repetitive language; suggestions/modifications for remediating repetitive language; data analysis insights including linguistic analysis associated with specific content including content identified as having repetitive language; data analysis insights providing telemetric analysis regarding identified (potential) repetitive language including user-specific analytics and/or cross-user/cross-application/service analytics; improved GUI menus to manage automated processing including the management of application of autocorrections, or any combination thereof. User interface system 409 comprises a graphical user interface that presents graphical user interface elements representative of any point in the processing described in the foregoing description including processing operations described in system diagram 100 (FIG. 1A), process flow 120 (FIG. 1B), method 200 (FIG. 2) and front-end representations related to the description of FIGS. 3A-3G. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., education platform service) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   identifying terms in an electronic document;
   applying linguistic analysis to evaluate syntactic relationships between one or more strings of the terms within a predetermined proximity window threshold;
   determining whether a repetition flag should be raised for identifying an instance of repetitive language between two or more terms based on a result of the applying of the linguistic analysis; and
   generating a suggestion determination as to whether to suggest a modification of the repetitive language based on a result of determining whether the repetition flag is raised.

2. The method of claim 1, further comprising: generating, when the suggestion determination indicates to suggest the modification of the instance of repetitive language, a repetition modification suggestion based on the result of the linguistic analysis, wherein the repetition modification suggestion is providable to a user through a graphical user interface (GUI) of an application or service.

3. The method of claim 2, further comprising: rendering, through the GUI of the application or service, the repetition modification suggestion, wherein the repetition modification suggestion comprises an identification of the instance of repetitive language and a suggested correction to remedy the instance of repetitive language.

4. The method of claim 3, wherein the repetition modification suggestion comprises identification of a linguistic rationale as to why the instance of repetitive language is considered repetitious based on the result of the linguistic analysis.

5. The method of claim 1, further comprising: applying trained artificial intelligence (AI) processing that is configured to execute the applying of the linguistic analysis, the determining of whether the repetition flag should be raised for the instance of repetitive language, and the generating of the suggestion determination.

6. The method of claim 1, wherein the applying of the linguistic analysis further comprises applying a plurality of linguistic analysis rules that evaluate syntactical relationships between groupings of terms identified within the predetermined proximity window threshold.

7. The method of claim 1, further comprising: automatically applying an autocorrection of the instance of repetitive language based on an autocorrection determination generated from application of trained artificial intelligence (AI)

processing that analyzes the result of the linguistic analysis and user activity signal data to generate the autocorrection determination.

8. The method of claim 7, further comprising: generating an autocorrection notification based on the automatically applying of the autocorrection, wherein the autocorrection notification provide an identification of the autocorrection and an indication of a linguistic rationale as to why the autocorrection was automatically applied; and providing, through a graphical user interface (GUI) of an application or service, the autocorrection notification.

9. A system comprising:
  at least one processor; and
  a memory, operatively connected with the at least one processor, storing computer-executable instructions that, when executed by the at least one processor, causes the at least one processor to execute a method that comprises:
    identifying terms in an electronic document;
    applying linguistic analysis to evaluate syntactic relationships between one or more strings of the terms within a predetermined proximity window threshold;
    determining whether a repetition flag should be raised for identifying an instance of repetitive language repetitive language between two or more terms based on a result of the applying of the linguistic analysis; and
    generating a suggestion determination as to whether to suggest a modification of the instance of repetitive language based on a result of determining whether the repetition flag is raised.

10. The system of claim 9, wherein the method, executed by the at least one processor, further comprises: generating, when the suggestion determination indicates to suggest the modification of the instance of repetitive language, a repetition modification suggestion based on the result of the linguistic analysis, wherein the repetition modification suggestion is providable to a user through a graphical user interface (GUI) of an application or service.

11. The system of claim 10, wherein the method, executed by the at least one processor, further comprises: rendering, through the GUI of the application or service, the repetition modification suggestion, wherein the repetition modification suggestion comprises an identification of the instance of repetitive language and a suggested correction to remedy the instance of repetitive language.

12. The system of claim 11, wherein the repetition modification suggestion comprises identification of a linguistic rationale as to why the instance of repetitive language is considered repetitious based on the result of the linguistic analysis.

13. The system of claim 9, wherein the method, executed by the at least one processor, further comprises: applying trained artificial intelligence (AI) processing that is configured to execute the applying of the linguistic analysis, the determining of whether the repetition flag should be raised for the repetitive language, and the generating of the suggestion determination.

14. The system of claim 9, wherein the applying of the linguistic analysis further comprises applying a plurality of linguistic analysis rules that evaluate syntactic relationships between groupings of terms identified within the predetermined proximity window threshold.

15. The system of claim 9, wherein the method, executed by the at least one processor, further comprises: automatically applying an autocorrection of the instance of repetitive language based on an autocorrection determination generated from application of trained artificial intelligence (AI) processing that analyzes the result of the linguistic analysis and user activity signal data to generate the autocorrection determination.

16. The system of claim 15, wherein the method, executed by the at least one processor, further comprises: generating an autocorrection notification based on the automatically applying of the autocorrection, wherein the autocorrection notification provide an identification of the autocorrection and an indication of a linguistic rationale as to why the autocorrection was automatically applied; and providing, through a graphical user interface (GUI) of an application or service, the autocorrection notification.

17. A computer-implemented method providing a suggestion for modifying repetitive terminology in an electronic document, the computer-implemented method comprising:
  identifying terms in electronic document;
  identifying an instance of repetitive language between two or more of the terms based on application of linguistic analysis that analyzes syntactic relationships between terms within a predetermined proximity window threshold;
  generating a suggestion for modification of the instance of repetitive language based on a result of the of the application of the linguistic analysis; and
  providing, through a graphical user interface (GUI) of an application or service, a GUI element providing the suggestion for modification of the instance of repetitive language.

18. The computer-implemented method of claim 17, wherein the GUI element comprises an identification of the instance of repetitive language and a suggested correction to remedy the instance of repetitive language.

19. The method of claim 18, wherein the GUI element further comprises an identification of a linguistic rationale as to why the instance of repetitive language is considered repetitious based on the result of the application of the linguistic analysis.

20. The computer-implemented method of claim 17, further comprising: applying trained artificial intelligence (AI) processing that is configured to execute application of the linguistic analysis and generate determinations therefrom, wherein the applying of the trained AI processing is usable to execute: the identifying of the terms of the electronic document, the identifying of the instance of repetitive language between two or more of the terms, and the generating of the suggestion determination.

* * * * *